(12) United States Patent
Benedyk et al.

(10) Patent No.: US 7,113,581 B2
(45) Date of Patent: Sep. 26, 2006

(54) METHODS AND SYSTEMS FOR PROVIDING DYNAMIC ROUTING KEY REGISTRATION

(75) Inventors: Robby Darren Benedyk, Raleigh, NC (US); Dan Alan Brendes, Raleigh, NC (US); David Michael Sprague, Raleigh, NC (US); Mark Ernest Davidson, Chapel Hill, NC (US); Peter Joseph Marsico, Carrboro, NC (US)

(73) Assignee: Tekelec, Calabasas, CA (US)

( * ) Notice: Subject to any disclaimer, the term of this patent is extended or adjusted under 35 U.S.C. 154(b) by 877 days.

(21) Appl. No.: 09/839,394

(22) Filed: Apr. 20, 2001

(65) Prior Publication Data

US 2001/0055380 A1 Dec. 27, 2001

Related U.S. Application Data

(60) Provisional application No. 60/198,967, filed on Apr. 21, 2000.

(51) Int. Cl.
*H04L 12/66* (2006.01)
*H04M 7/00* (2006.01)

(52) U.S. Cl. .................. 379/219; 379/221.04; 379/230; 370/225; 370/389; 370/401

(58) Field of Classification Search .................. 379/219, 379/221.04, 230; 455/433; 370/225, 355, 370/389, 401
See application file for complete search history.

(56) References Cited

U.S. PATENT DOCUMENTS

| | | | |
|---|---|---|---|
| 5,008,929 | A | 4/1991 | Olsen et al. |
| 5,142,622 | A | 8/1992 | Owens |
| 5,208,811 | A | 5/1993 | Kashio et al. |
| 5,239,542 | A | 8/1993 | Breidenstein et al. |

(Continued)

FOREIGN PATENT DOCUMENTS

| | | |
|---|---|---|
| EP | 0 853 411 A2 | 7/1998 |
| WO | WO97/11563 | 3/1997 |
| WO | WO98/28885 | 7/1998 |
| WO | WO00/19758 | 4/2000 |
| WO | WO 00/22840 | 4/2000 |
| WO | WO 00/30369 | 5/2000 |
| WO | WO 00/31933 | 6/2000 |
| WO | WO00/33519 | 6/2000 |
| WO | WO 00/56032 | 9/2000 |

OTHER PUBLICATIONS

O'Shea, "Mating Season," Telephony, p. 10–11, (Sep. 20, 1999).

Lakshmi–Ratan, "The Lucent Technologies Softswitch–Realizing the Promise of Convergence," Bell Labs Technical Journal, p. 174–195, (Apr.–Jun., 1999).

Hamdi et al., "Voice Service Interworking for PSTN and IP Networks," IEEE Communications Magazine, p. 104–111, (May, 1999).

(Continued)

*Primary Examiner*—Harry S. Hong
(74) *Attorney, Agent, or Firm*—Jenkins, Wilson & Taylor, P.A.

(57) ABSTRACT

Disclosed is a communications network element that is capable of routing signaling messages and includes a dynamic routing key registration feature which allows Internet protocol (IP) nodes to automatically register/de-register and subsequently direct traffic towards or away from themselves without the need for manual operator intervention. A signaling gateway routing node includes a self-registering data communication module (sDCM) that is adapted to receive and process dynamic routing key registration messages from associated IP nodes. Such dynamic routing key registration messages may include information that is used to register a new routing key association with a TCP/IP connection, de-register an existing routing key association with the TCP/IP connection, or modify routing key information associated with the TCP/IP connection.

68 Claims, 15 Drawing Sheets

U.S. PATENT DOCUMENTS

| | | |
|---|---|---|
| 5,315,641 A | 5/1994 | Montgomery et al. |
| 5,384,840 A | 1/1995 | Blatchford et al. |
| 5,420,916 A | 5/1995 | Sekiguchi |
| 5,430,727 A | 7/1995 | Callon |
| 5,509,010 A | 4/1996 | LaPorta et al. |
| 5,568,487 A | 10/1996 | Sitbon et al. |
| 5,581,558 A | 12/1996 | Horney, II et al. |
| 5,583,927 A | 12/1996 | Ely et al. |
| 5,586,177 A | 12/1996 | Farris et al. |
| 5,638,431 A | 6/1997 | Everett et al. |
| 5,640,446 A | 6/1997 | Everett et al. |
| 5,650,998 A * | 7/1997 | Angenot et al. ............ 370/225 |
| 5,651,002 A | 7/1997 | Van Seters et al. |
| 5,657,452 A | 8/1997 | Kralowetz et al. |
| 5,664,102 A | 9/1997 | Faynberg |
| 5,675,635 A | 10/1997 | Vos et al. |
| 5,680,552 A | 10/1997 | Netravali et al. |
| 5,696,809 A | 12/1997 | Voit |
| 5,701,301 A | 12/1997 | Weisser, Jr. |
| 5,706,286 A | 1/1998 | Reiman et al. |
| 5,712,903 A | 1/1998 | Bartholomew et al. |
| 5,732,213 A | 3/1998 | Gessel et al. |
| 5,740,374 A | 4/1998 | Raffali-Schreinemachers |
| 5,761,281 A | 6/1998 | Baum et al. |
| 5,761,500 A | 6/1998 | Gallant et al. |
| 5,764,750 A | 6/1998 | Chau et al. |
| 5,764,955 A | 6/1998 | Doolan |
| 5,768,361 A | 6/1998 | Cowgill |
| 5,768,525 A | 6/1998 | Kralowetz et al. |
| 5,774,695 A | 6/1998 | Autrey et al. |
| 5,781,534 A | 7/1998 | Perlman et al. |
| 5,787,255 A | 7/1998 | Parlan et al. |
| 5,793,771 A | 8/1998 | Darland et al. |
| 5,802,285 A | 9/1998 | Hirviniemi |
| 5,805,587 A | 9/1998 | Norris et al. |
| 5,812,781 A | 9/1998 | Fahlman et al. |
| 5,815,669 A | 9/1998 | Lee et al. |
| 5,828,844 A | 10/1998 | Civanlar et al. |
| 5,838,782 A | 11/1998 | Lindquist |
| 5,852,660 A | 12/1998 | Lindquist et al. |
| 5,867,495 A | 2/1999 | Elliott et al. |
| 5,870,565 A | 2/1999 | Glitho |
| 5,872,782 A | 2/1999 | Dendi |
| 5,878,129 A | 3/1999 | Figurski et al. |
| 5,889,954 A | 3/1999 | Gessell et al. |
| 5,892,822 A | 4/1999 | Gottlieb et al. |
| 5,912,887 A | 6/1999 | Sehgal |
| 5,917,900 A | 6/1999 | Allison et al. |
| 5,920,562 A | 7/1999 | Christie et al. |
| 5,923,659 A | 7/1999 | Curry et al. |
| 5,926,482 A | 7/1999 | Christie et al. |
| 5,940,598 A | 8/1999 | Strauss et al. |
| 5,949,871 A | 9/1999 | Kabay et al. |
| 5,958,016 A | 9/1999 | Chang et al. |
| 5,974,052 A | 10/1999 | Johnson et al. |
| 5,991,301 A | 11/1999 | Christie |
| 5,995,608 A | 11/1999 | Detampel, Jr. et al. |
| 6,006,098 A | 12/1999 | Rathnasabapathy et al. |
| 6,011,780 A | 1/2000 | Vaman et al. |
| 6,011,794 A | 1/2000 | Mordowitz et al. |
| 6,011,803 A | 1/2000 | Bicknell et al. |
| 6,014,379 A | 1/2000 | White et al. |
| 6,018,515 A | 1/2000 | Sorber |
| 6,021,126 A | 2/2000 | White et al. |
| 6,023,502 A | 2/2000 | Bouanaka et al. |
| 6,026,091 A | 2/2000 | Christie et al. |
| 6,047,005 A | 4/2000 | Sherman et al. |
| 6,064,653 A | 5/2000 | Farris |
| 6,067,546 A | 5/2000 | Lund |
| 6,069,890 A | 5/2000 | White et al. |
| 6,075,783 A | 6/2000 | Voit |
| 6,078,582 A | 6/2000 | Curry et al. |
| 6,079,036 A | 6/2000 | Moharram |
| 6,084,892 A | 7/2000 | Benash et al. |
| 6,084,956 A | 7/2000 | Turner et al. |
| 6,094,437 A | 7/2000 | Loehndorf, Jr. et al. |
| 6,097,719 A | 8/2000 | Benash et al. |
| 6,097,805 A | 8/2000 | Figurski et al. |
| 6,111,893 A | 8/2000 | Volftsun et al. |
| 6,112,090 A | 8/2000 | Valentine |
| 6,115,383 A | 9/2000 | Bell et al. |
| 6,118,779 A | 9/2000 | Madonna |
| 6,118,780 A | 9/2000 | Dunn et al. |
| 6,119,160 A | 9/2000 | Zhang et al. |
| 6,122,255 A | 9/2000 | Bartholomew et al. |
| 6,122,263 A | 9/2000 | Dhalin et al. |
| 6,122,365 A | 9/2000 | Yegoshin |
| 6,125,111 A | 9/2000 | Snow et al. |
| 6,125,177 A | 9/2000 | Whittaker |
| H1880 H | 10/2000 | Vines et al. |
| H1896 H | 10/2000 | Hoffpauir et al. |
| 6,128,379 A | 10/2000 | Smyk |
| 6,134,235 A | 10/2000 | Goldman et al. |
| 6,134,246 A | 10/2000 | Cai et al. |
| 6,137,869 A | 10/2000 | Voit et al. |
| 6,137,874 A | 10/2000 | Brown et al. |
| 6,144,667 A | 11/2000 | Doshi et al. |
| 6,144,670 A | 11/2000 | Sponaugle et al. |
| 6,151,390 A | 11/2000 | Volftsun et al. |
| 6,154,467 A | 11/2000 | Hager et al. |
| 6,157,710 A | 12/2000 | Figurski et al. |
| 6,178,181 B1 | 1/2001 | Glitho |
| 6,192,051 B1 * | 2/2001 | Lipman et al. ............. 370/389 |
| 6,195,425 B1 | 2/2001 | Farris |
| 6,201,804 B1 | 3/2001 | Kikinis |
| 6,215,783 B1 | 4/2001 | Neyman |
| 6,236,722 B1 | 5/2001 | Gilbert et al. |
| 6,324,183 B1 | 11/2001 | Miller et al. |
| 6,411,632 B1 | 6/2002 | Lindgren et al. |
| 6,507,649 B1 | 1/2003 | Tovander |
| 6,515,997 B1 * | 2/2003 | Feltner et al. ............... 370/401 |
| 6,584,190 B1 | 6/2003 | Bressler |
| 6,594,258 B1 | 7/2003 | Larson et al. ............... 370/353 |
| 6,611,533 B1 | 8/2003 | Liao et al. ................... 370/467 |
| 6,674,748 B1 | 1/2004 | Dykhuizen et al. ......... 370/352 |
| 6,678,242 B1 | 1/2004 | Simon ........................ 370/218 |
| 2001/0029182 A1 * | 10/2001 | McCann et al. ............. 455/433 |
| 2001/0046227 A1 * | 11/2001 | Matsuhira et al. .......... 370/355 |
| 2002/0048360 A1 | 4/2002 | Zambre et al. |

OTHER PUBLICATIONS

Tekelec, "Eagle (Registered) Feature Guide," PN/9110-1225-01, (Jan., 1998).

Tekelec, "Eagle (Registered) STP Platform," 908-0126-01, (1997).

Tekelec, "STP Lan Interface Feature," 908-0134-01, (1997).

Tekelec, "STP Database Transport Access Feature," 908-0136-01, (1997).

Tekelec, "STP X.25 to SS7–IS.41 Protocol Conversion Feature," 908-0135-01, (1997).

Tekelec, "STP ANSI–ITU Gateway Feature," 908-0133-01, (1997).

Tekelec, "SS7–Frame Relay Access Device SS7 Protocol Information Translator," 908-0167-01, (1997).

O'Shea, "The Network That's Never Done," Telephony, p. 38, 40, 42, and 43, (Sep. 15, 1997).

Snyder, "Rerouting Internet Traffic Jams," Telephony, p. 12, (Nov. 11, 1996).

Snyder, "Branded With Optics," Telephony, p. 49–50, (Jul. 22, 1996).

ANONYMOUS, "Around the Loop," Telephony, p. 26, (Jul. 22, 1996).

Zaharychuk et al., "Gateway Signal Transfer Points: Design, Services and Benefits," IEEE, p. 223.2.1–223.2.8, (1990).

Bootman et al., "Generic Building Blocks for the Telecommunications Management Network," IEEE, p. 6.1.1–6.1.5, (1988).

Bootman, "Intelligent Network Services Using a Service Switching Node," IEEE, p. 40.7.1–40.7.4, (1988).

Buckles, "Very High Capacity Signaling Transfer Point For Intelligent Network Services," IEEE, p. 40.2.1–40.2.4, (1988).

Michael McGrew, "Transport SS7 Signaling Over IP," Lucent Technologies Inc., p. 1–8. (Nov. 1998).

Pai, "In–Building Wirless: The Next Generation," TelephonyOnline.com, pp. 1–4 (Jun. 30, 2004).

Handa, "In Building Wirless: The Next Generation," TMCnet.com, pp. 1–7 (Feb. 12, 2004).

Fitchard, "A New Voice in the Boardroom," Wirless Review, pp. 1–3 (Sep. 1, 2003).

"Fixed Wirless Technology," ISP Planet, pp. 1–4 (May 14, 2002).

Martinek, "Office on the Fly," Wirless Review, pp. 1–4 (Jul. 15, 2001).

"Mar. Networks 3300 Intergrated Communications Platform," Mitel Networks Corporation, pp. 1–34 (Jul. 2001).

Swartz, "Ready, Set, Wireless Office!, " Wirless Review, pp. 1–4 (Jun. 1, 2000).

"Telstra and Ericsson Trial Next Generation Wirless Office Solution," Ericsson, pp. 1–2 (Apr. 28, 2000).

"Mitel and Ericsson Join Forces to Deliver an Integrated Digital Wirless Office Solution with PBX Functionally–Company Business and Marketing," Cambridge Telcom Report, pp. 1–4 (Apr. 24, 2000).

"Market and Development Agreement Targets Customers Looking for Ways to Become More Productive Through Convenient and Cost–Effective Communication," Ericsson Press Release, pp. 1–2 (Apr. 4, 2000).

Sulkin, "Emerging Options for Wireless PBXs," Voice2000, pp. 1–8 (Feb. 2000).

Drewianowski, "WLANs –For the Picking," Communications Solutions® Next–Gen Networks, pp. 1–9 (Jan. 2000).

"The Wireless Business Connection," Second Quarter 2000 Report, The Phillips Group –Infotech, pp. 1–9 (2000).

"Ericsson Announces General Availability of its Mobile Advantage Wireless Office System," Ericsson Press Release, pp. 1–2 (Nov. 4, 1999).

"Corporate Offices to Go Wireless First Australian GSM on the Net Trial," Ericsson Press Release, pp. 1–3 (Aug. 11, 1999).

"Ericsson Solution Chosen for World's First Combined DECT/GSM Communications Services," Ercisson, pp. 1–9 (Jun. 21, 1999).

Johanson et al., "Mobile Advantage Wireless Office—A Digital Wireless Office System for TDMA/136 Networks," Ericsson Review No. 1, pp. 20–27 (1999).

"Enterprise IP Gateway," Ericsson, pp. 1–6 (1999).

"The Ericsson IPT System," Ericsson, pp. 1–8 (1999).

"Wireless: Top Ericsson Executives Lay Out Corporate Vision, Vision, Unveil Strategy for the Enterprise Customer –Company Business and Marketing," EDGE, On & About AT&T, pp. 1–5 (Nov. 30, 1998).

"Ericsson Wireless Office Services to Provide Digital System Through AT&T Wireless Services," Ericsson Press Release, pp. 1–2 (Apr. 17, 1998).

Woods, "Fresno Bee Still Buzzing About Wireless, " TechNews, pp. 1–2 (1995).

"teleSys Annouces the Compatibility of Ericssion's Mobile Advantage Wireless Office and telesys'MACH –IP Gateway," telesys Software –Press Release, pp. 1–2 (Publication Date Unknown).

* cited by examiner

Routing Key Specific Data

| Routing Key Type | Common | RKRP Flags | SI | DPC | OPC | CICS | CICE | SPLT | NCICS | NCICE | SSN |
|---|---|---|---|---|---|---|---|---|---|---|---|
| CIC Based | x | x | x | x | x | x | x | x | x | x | |
| SCCP Based | x | x | x | x | | | | | | | x |
| DPC - SI - OPC | x | x | x | x | x | | | | | | |
| DPC - SI - * | x | x | x | x | | | | | | | |
| DPC - * - * | x | x | | x | | | | | | | |
| * - SI - * | x | x | x | | | | | | | | |
| * (Default) | x | x | | | | | | | | | |

Figure 5

Dynamic Routing Key Table

| | KEY(s) | | | | | | | | DATA |
|---|---|---|---|---|---|---|---|---|---|
| DPC | OPC | SI | CICS | CICE | SPLIT | NCICS | NCICE | SSN | SOCKET ID |
| 3-1-1 | 6-1-1 | 3 | - | - | - | - | - | 54 | Sock1 |
| 3-1-2 | 6-1-1 | 3 | - | - | - | - | - | 67 | Sock2 |
| 3-1-3 | 6-1-1 | 3 | - | - | - | - | - | 12 | Sock3 |
| 1-1-1 | 6-1-1 | 3 | - | - | - | - | - | 45 | Sock4 |
| 1-1-2 | 7-1-1 | 5 | 25 | 28 | - | - | - | - | Sock5 |
| 1-1-3 | 6-1-1 | 5 | 12 | 13 | - | - | - | - | Sock6 |

Figure 7

Socket Table

| | KEY | DATA | | | | |
|---|---|---|---|---|---|---|
| | | Local | | Distant | | |
| | Socket ID | IP Address | TCP Port | IP Address | TCP Port | Socket Status |
| | Sock1 | 10.10.10.10 | 24 | 10.10.10.1 | 24 | A |
| | Sock2 | 10.10.10.10 | 42 | 10.10.10.1 | 42 | A |
| | Sock3 | 10.10.10.10 | 12 | 10.10.10.1 | 12 | A |
| | Sock4 | 10.10.10.10 | 54 | 10.10.20.1 | 54 | A |
| | Sock5 | 10.10.10.10 | 16 | 10.10.20.1 | 16 | A |
| | Sock6 | 10.10.10.10 | 76 | 10.10.20.1 | 17 | U |

Figure 8

| Return Code | SI | Type of requests checked | Description |
|---|---|---|---|
| 1 | all | all | Transaction successfully completed. |
| 2 | all | all | Length of TALI message is insufficient to contain all required information for 'rkrp' operation. |
| 3 | N/A | all | Unsupported 'rkrp' operation |
| 4 | all | all | Invalid SI. SI must be in range 0..15 |
| 5 | all | all | Invalid SI/opcode combination. Split and resize only supported for SI=5. Enter, delete and override supported for all SI. |
| 6 | all | all | Invalid DPC. Point code cannot be zero, and type must be ANSI. |
| 7 | 3 | all with SI=3 | Invalid SSN. SSN must be in range 0..255. |
| 8 | 5 | all with SI=5 | Invalid OPC. Point code cannot be zero, and type must be ANSI. |
| 9 | 5 | all with SI=5 | Invalid CICS. Must be in range 0..16383. |
| 10 | 5 | all with SI=5 | Invalid CICE. Must be in range 0..16383. |
| 11 | 5 | all with SI=5 | Invalid CIC range. CICS must be less than or equal to CICE. On a split operation, CICS must be strictly less than than CICE (cannot split an range with only one entry). |
| 12 | 5 | resize | Invalid NCICS. Must be in range 0..16383. |
| 13 | 5 | resize | Invalid NCICE. Must be in range 0..16383. |
| 14 | 5 | resize | Invalid new CIC range. NCICS must be less than or equal to NCICE. |
| 15 | 5 | split | Invalid SPLIT value. Must be in range 0..16383. Must be greater than CICS and less than or equal to CICE. |
| 16 | all, 5 | enter, split | No free entries in table. |
| 17 | 5 | enter, override | CIC range overlaps but does not match existing entry. |
| 18 | all | enter | Entry already has 16 associations. |
| 19 | 5 | resize, split, override | Entry to be changed not found in table. |
| 20 | 5 | resize | New entry would overlap another entry (allowed to overlap the entry being changed, but no others). |
| 21 | all | delete | Entry to be deleted not found in table. |

Figure 9

METHODS AND SYSTEMS FOR PROVIDING DYNAMIC ROUTING KEY REGISTRATION

PRIORITY APPLICATION INFORMATION

This application claims the benefit of U.S. Provisional Patent Application No. 60/198,967, filed Apr. 21, 2000, the disclosure of which is incorporated herein by reference in its entirety.

TECHNICAL FIELD

The present invention relates to the routing of signaling messages in a converged telephony-data networking environment, and more particularly to the automatic registration of routing key information at a gateway routing node.

BACKGROUND ART

The convergence of traditional telecommunication networks and traditional data networks has given rise to a number of challenging connectivity issues. Such connectivity issues are particularly significant in the realm of call control signaling. More specifically, traditional public switched telephone network (PSTN) call control signaling is performed via a signaling system 7 (SS7) signaling protocol, while signaling within a data network is typically performed by any of a number of signaling protocols including: transport adapter layer interface (TALI), session initiation protocol (SIP), session description protocol (SDP), H.323, M2UA, M3UA, SUA, etc. In a converged communication network environment, such call control signaling protocols are employed to provide a variety of converged or inter-network services. These services include providing basic call setup and teardown functionality, as well as facilitating communications-related database access. For example, call control signaling protocols are typically employed to access number portability database applications, 800/toll-free number database applications, line information database applications, calling name database applications, home location register applications, presence service databases, telephony-to-WWW domain name servers, etc.

With regard to the call setup and teardown functionality provided by call signaling protocols, it will be appreciated that a number of switching points are typically involved in the successful completion of a call. In a traditional PSTN type network, such switching points include: end offices, tandem offices, and signal transfer points. Once again, in a pure PSTN environment, SS7 signaling messages are typically employed to facilitate such call setup operations. In a converged network, such switching points may include: end offices, softswitches, media gateway controllers, media gateways, etc. In a converged network environment, a combination of SS7 and a data network-based signaling protocol (e.g., SIP, H.323, M2UA, M3UA, etc.) may be employed to provide call setup/teardown functionality. In the case of a pure data network based communication network, the SS7 signaling protocol may be replaced completely by one or more data network signaling protocols.

As the converged network environment continues to evolve and expand, the tendency of network operators to place call switching and call service database nodes within the data network component of the converged network environment is increasing. That is to say, PSTN and wireless telephone network operators are finding the economics of data network operation favorable to the placement of signaling nodes within the data sub-network of the converged network environment, as opposed to the traditional PSTN—SS7 sub-network. As such, signaling point elements that have traditionally resided within an SS7 signaling network and been assigned unique SS7 network addresses (point codes and subsystem numbers) are now being placed within a data network, such as a TCP/IP-based network, and consequently being assigned IP addresses and port numbers.

A detailed discussion of such data-network-based telephony nodes and associated access techniques and protocols can be found in commonly-assigned, co-pending International Patent Publication No. WO 00/60812, entitled Methods and Systems For Providing Database Node Access Control Functionality In A Communications Network Routing Node, the disclosure of which is incorporated herein by reference in entirety.

Shown in FIG. 1 is a sample converged communication network, generally indicated by the numeral 100. Converged network 100 includes a signaling system 7 (SS7) network component 102 and an Internet protocol (IP) network component 104. The SS7 network component includes a service switching point (SSP) 106. The IP network component includes a pair of media gateway controller (MGC) nodes 108 and 110, and a media gateway (MG) node 112. An SS7-IP signaling gateway routing node (SG) 114 connects data network nodes and SS7 network nodes. It will be appreciated that an SS7 signaling protocol is employed between SSP 106 and SG 114, while a data network signaling protocol such as TALI over TCP/IP or SCTP/IP is used to facilitate communication between SG 114 and the MGC pair, 108 and 110.

It will be appreciated by those skilled in the art of SS7 communications that within an SS7 signaling network, nodes are connected via dedicated 56 kbps signaling communication links. Each signaling link provides 56 kbps of bandwidth that is dedicated to communication between a pair of connected SS7 nodes. However, in an IP-based signaling network, nodes are typically connected via much faster links (typically on the order of megabits per second, depending on the underlying physical and datalink layer technologies). These high bandwidth links may be shared by a number of IP nodes simultaneously. A given path in an IP network may be shared by traffic from a number of connections, which can be set up and torn down dynamically.

Because SS7 signaling links are dedicated to carrying SS7 traffic and have a fixed bandwidth, the addition of a new SS7 connection at SG 114 would require the physical installation of a new, dedicated 56 kbps SS7 signaling link. However, the addition of a new TCP/IP connection at SG 114 would simply require the sharing of existing broadband resources so as to create a new TCP/IP connection. Unlike the SS7 link creation scenario, the creation of a TCP/IP connection does not necessarily require the addition of new physical resources and, instead, can be performed dynamically via software. Consequently, the addition of and connection to a new IP based network node does not necessarily require the addition of a new physical communication link at SG 114. If existing bandwidth is sufficient, the addition of a new connection to SG 114 may only require the establishment of an additional TCP/IP connection between SG 114 and the node in the IP network with which communication is desired.

Returning now to FIG. 1, it will be appreciated that an external provisioning platform 116 is adapted to communicate with the SG 114 for the purpose of provisioning signaling links, administering routing data and generally configuring services provided by the node. As such, signaling link configuration and associated routing data/routing rules must be entered or modified manually by an operator via provisioning workstation 116 each time a new MGC node is added to the network, or a change in routing preference is indicated. Such manual provisioning tasks are time intensive, costly, and prone to operator error.

Therefore, what is needed is a method and system for allowing IP connected network elements to automatically and dynamically register their presence and routing preferences at an associated network routing node, thereby minimizing or eliminating the need for manual provisioning of such configuration tasks.

DISCLOSURE OF THE INVENTION

According to one aspect, the present invention includes a signaling gateway (SG) that is capable of providing inter-network message routing services in a converged telephony-data network environment. The SG includes a dynamic routing key registration feature which allows Internet protocol (IP) sockets to dynamically register/de-register their routing information with the signaling gateway and subsequently direct traffic towards or away from themselves without the need for manual operator intervention.

In one embodiment, an SG includes a self-registering data communication module (sDCM) that is adapted to receive and process dynamic routing key registration messages from associated IP nodes over existing transmission control protocol/IP (TCP/IP) connections. Such dynamic routing key registration messages may include information that is used to register a new routing key association with a TCP/IP connection, de-register an existing routing key associated with a TCP/IP connection, or modify routing key information associated with an existing TCP/IP connection. It is understood that a TCP/IP connection may be identified locally on a signaling gateway by a data structure known as a socket. Thus, in order to allow dynamic registration of routing keys associated with a TCP/IP connection, a signaling gateway may associate the routing keys with a local socket for the connection.

As used herein, the term "routing key" refers to a parameter or combination of parameters to be extracted from or examined in a call signaling message to determine where to route the call signaling message. Exemplary SS7 routing keys include: originating point code (OPC), destination point code (DPC), subsystem number (SSN), and circuit identifier code (CIC). These routing keys have conventionally been used by SS7 nodes, such as signal transfer points to route call signaling messages to other SS7 signaling nodes. According to the present invention, IP nodes in an IP network are permitted to dynamically register SS7 routing keys in an SS7/IP signaling gateway to direct traffic to or away from themselves. This dynamic registration capability in a signaling gateway node avoids the difficulties of manual registration associated with conventional routing solutions.

The sDCM card employs a dual routing key table database structure that includes both a static routing key table and a dynamic routing key table. Received dynamic routing key registration messages are used to modify information in the dynamic routing key table only. During subsequent signaling message routing operations, the dynamic routing key table is searched first. The failure to locate a suitable or matching routing key entry in the dynamic routing key table results in a secondary or default search of the static routing key table.

The functions for facilitating dynamic or self-registration of IP-based network elements are described herein as modules or processes. It is understood that these modules or processes may be implemented as computer-executable instructions embodied in a computer-readable medium. Alternatively, the modules or processes described herein may be implemented entirely in hardware. In yet another alternative embodiment, the modules or processes described herein may be implemented as a combination of hardware and software.

The processes and modules for providing dynamic routing key registration functionality are described below as being associated with cards or subsystems within a gateway routing node. It is understood that these cards or subsystems include hardware for storing and executing the processes and modules. For example, each card or subsystems described below may include one or more microprocessors, such as an x86 microprocessor available from Intel Corporation or a K series microprocessor available from AMD Corporation, and associated memory.

Accordingly, it is an object of the present invention to provide a routing node that facilitates dynamic self-registration by Internet protocol nodes to which it is connected.

It is another object of the present invention to provide a routing node that facilitates dynamic self-de-registration by Internet protocol nodes to which it is connected.

It is yet another object of the present invention to provide a routing node that facilitates dynamic self-modification of routing key information by Internet protocol nodes to which it is connected.

It is yet another object of the present invention to provide a method and system for allowing IP network elements to automatically direct traffic towards or away from themselves by sending messages to a routing node.

It is yet another object of the present invention to provide a system and method for obtaining routing key information associated with the routing of signaling messages at a routing node that includes performing a primary lookup in a first routing key table, followed by a default lookup in second routing key table in the event that a suitable routing key entry is not located in the first routing key table.

It is yet another object of the present invention to provide a system and method for allowing a routing key delivered by a registration message, to override all existing, similar routing key entries in a routing key table maintained at a routing node so as to cause the routing node to direct all subsequent signaling traffic associated with the routing key to the TCP connection over which the registration message was sent.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 5 is a table detailing TALI registration message field structures according to an embodiment of the present invention.

FIG. 7 is a table that illustrates a sample dynamic routing key table structure according to an embodiment of the present invention.

FIG. 8 is a table that illustrates a sample socket table structure according to an embodiment of the present invention.

FIG. 9 is a table that illustrates sample TALI registration acknowledgment message return code values according to an embodiment of the present invention.

DETAILED DESCRIPTION OF THE INVENTION

Figure 1:
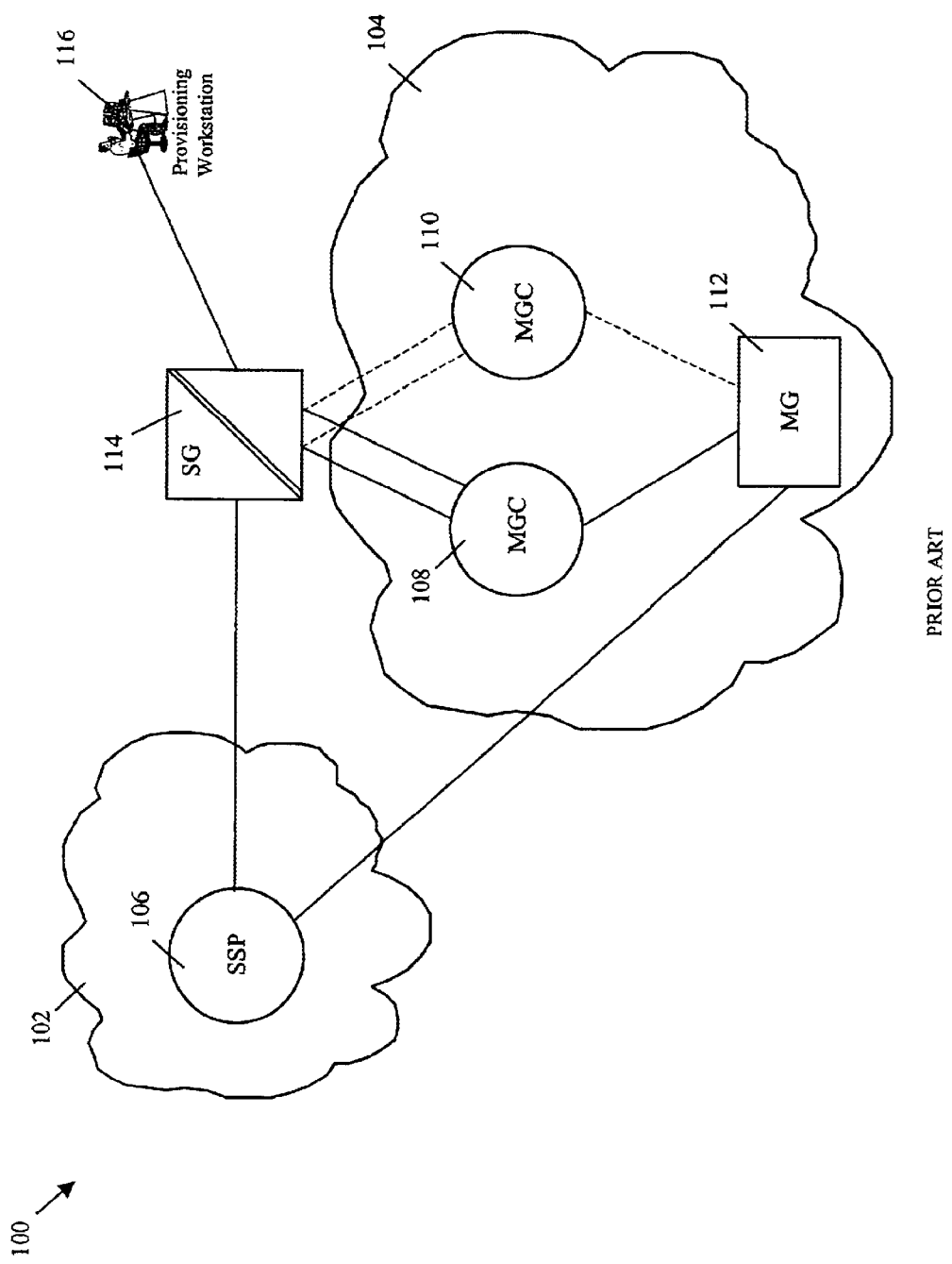
FIG. 1 is a network diagram illustrating a converged telephony-data network.
Figure 2:
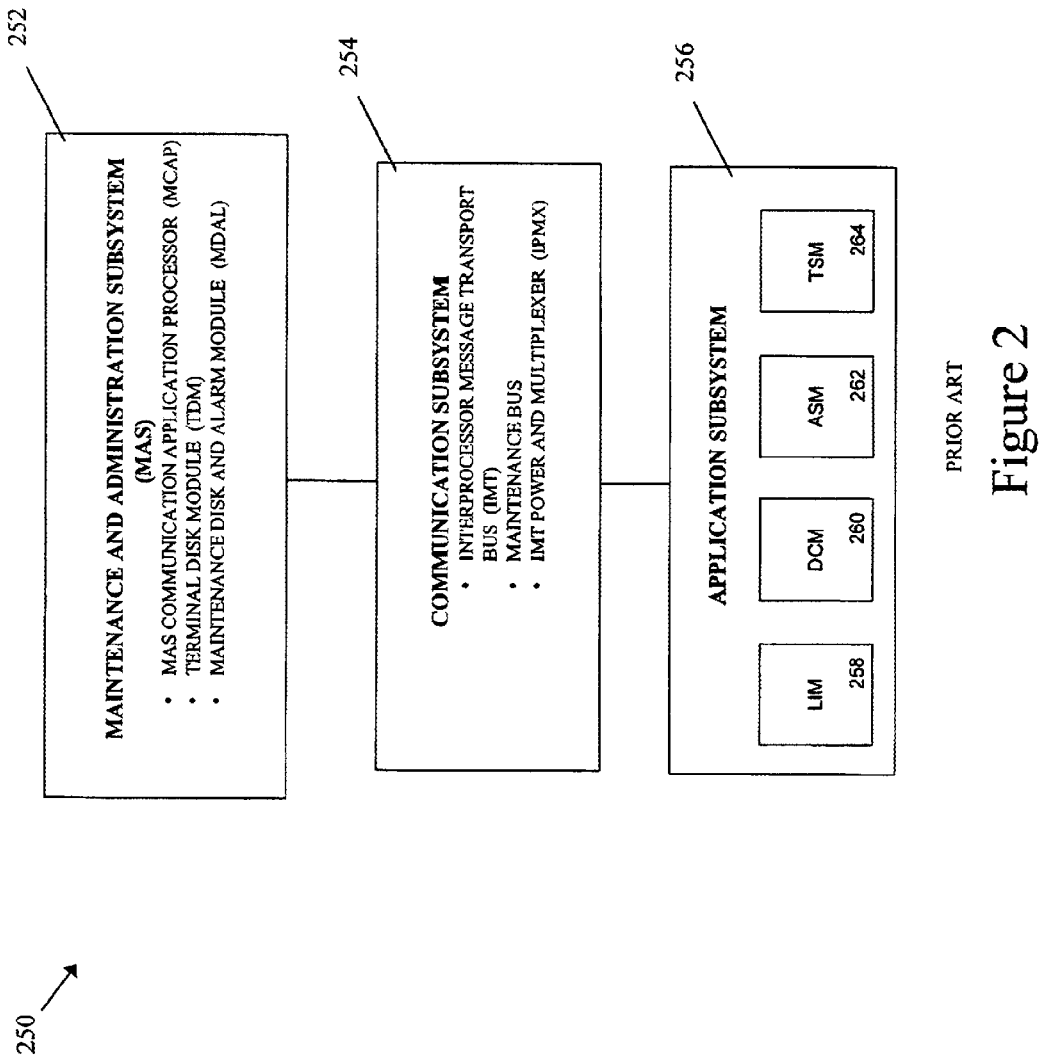
FIG. 2 is a block diagram of a conventional signaling gateway.

Disclosed herein are several embodiments of the present invention, all of which include a network element that performs functions similar to that of a traditional telecommunications network packet routing switch, such as a signaling gateway (SG) routing node. Each of the embodiments described and discussed below, employs an internal architecture similar to that of high performance signal transfer point (STP) and SG products which are marketed by Tekelec as the Eagle® STP and IP$^7$ Secure Gateway™, respectively. A block diagram that generally illustrates the base internal architecture of the IP$^7$ Secure Gateway™ product is shown in FIG. 2. A detailed description of the IP$^7$ Secure Gateway™ may be found in Tekelec publication PN/909-0767-01, Rev B, August 1999, entitled *Feature Notice IP$^7$ Secure Gateway™ Release* 1.0, the disclosure of which is incorporated by reference herein in its entirety. Similarly, a detailed description of the Eagle® STP may be found in the *Eagle® Feature Guide* PN/910-1225-01, Rev. B, January 1998, published by Tekelec, the disclosure of which is incorporated herein by reference in its entirety. The specific functional components of an IP$^7$ Secure Gateway™ for transmitting and receiving transaction capabilities application part (TCAP) messages over an Internet Protocol (IP) network are described in commonly-assigned, co-pending International Patent Publication No. WO 00/35155, the disclosure of which is incorporated herein by reference in its entirety. Similarly, the functional components of an IP$^7$ Secure Gateway™ for transmitting and receiving ISDN user part (ISUP) messages over an Internet Protocol (IP) network are described in commonly-assigned, co-pending International Patent Publication No. WO 00/35156, the disclosure of which is also incorporated herein by reference in its entirety. As described in the above referenced *Feature Notice IP$^7$ Secure Gateway™*, an IP$^7$ Secure Gateway™ 250 includes the following subsystems: a Maintenance and Administration Subsystem (MAS) 252, a communication subsystem 254 and an application subsystem 256. MAS 252 provides maintenance communications, initial program load, peripheral services, alarm processing and system disks. Communication subsystem 254 includes an interprocessor message transport (IMT) bus that is the main communication bus among all subsystems in the IP$^7$ Secure Gateway™ 250. This high-speed communications system functions as two 125 Mbps counter-rotating serial buses.

Application subsystem 256 includes application cards that are capable of communicating with the other cards through the IMT buses. Numerous types of application cards can be incorporated into SG 250, including but not limited to: a link interface module (LIM) 258 that provides SS7 links and X.25 links, a data communication module (DCM) 260 that provides a TCP/IP interface to external nodes and an application service module (ASM) 262 that provides global title translation, gateway screening and other services. A translation service module (TSM) 264 may also be provided to support triggered local number portability service. Again, it should also be appreciated that, in addition to conventional SS7 LIM cards, one or more DCM cards can be employed in a similar manner to provide for the transport of Internet Protocol (IP) encapsulated SS7 messages over an IP network, as described in the above referenced *Feature Notice IP$^7$ Secure Gateway™ Release* 1.0 publication.

Signaling Gateway Architecture

Figure 3:
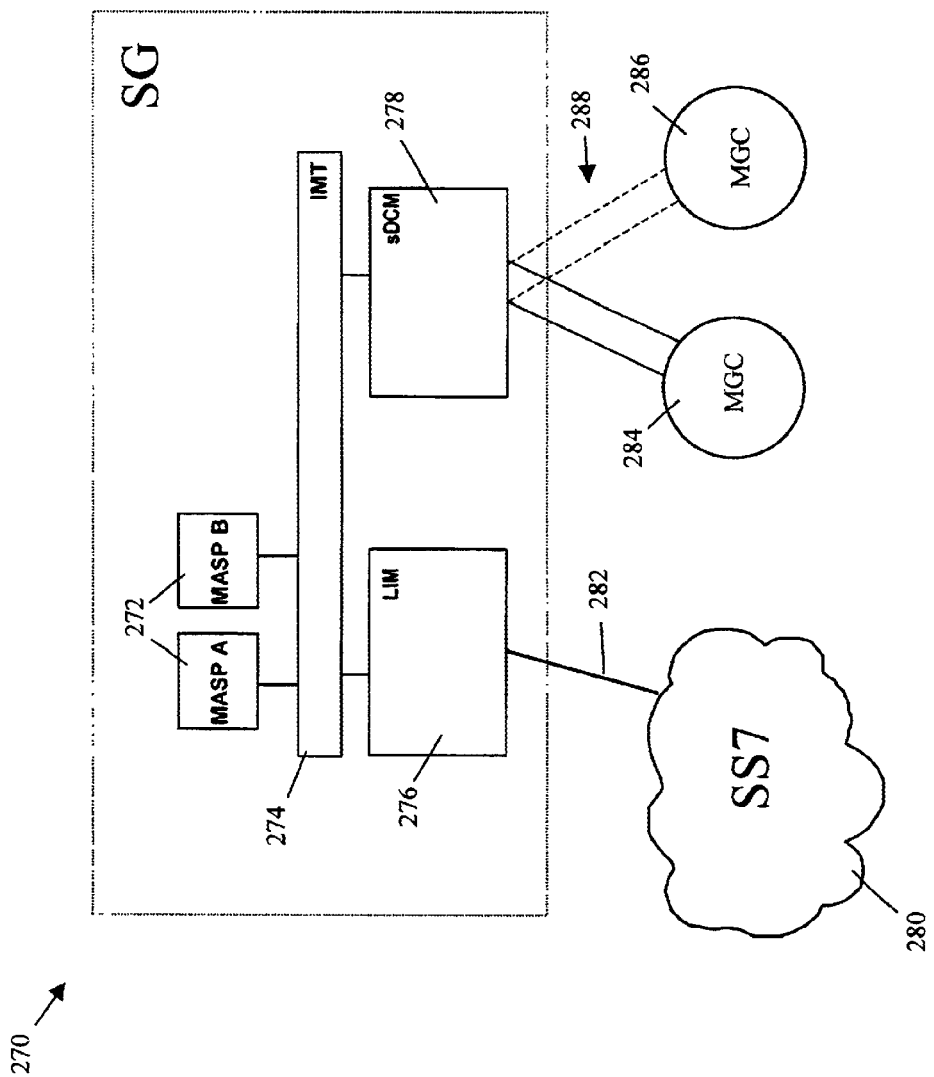
FIG. 3 is a schematic diagram of a signaling gateway including a self-registration data communication module (sDCM) according to an embodiment of the present invention.

FIG. 3 illustrates a signaling gateway (SG) routing node according to an embodiment of the present invention that is generally indicated by the numeral 270. SG routing node 270 is communicatively coupled to a signaling system 7 (SS7) signaling network 280 via an SS7 signaling link 282, and to a pair of media gateway controller nodes 284 and 286 via a plurality of TCP/IP connections 288. In this simplified example, it will be appreciated that the SS7 network, taken together with the TCP/IP connections, effectively constitute the functional network components of a converged telephony—data network. As further illustrated in FIG. 3, SG routing node 270 includes a high-speed interprocessor message transport (IMT) communications bus 274. Communicatively coupled to IMT bus 274 are a number of distributed processing modules or cards including: a pair of maintenance and administration subsystem processors (MASPs) 272, an SS7 capable link Interface module (LIM) 276, and an Internet protocol (IP) capable self-registration data communication module (sDCM) 278. These modules are physically connected to the IMT bus 274 such that signaling and other types of messages may be routed internally between all active cards or modules. For simplicity of illustration, only a single LIM 276 and sDCM 278 are included in FIG. 3. However, it should be appreciated that the distributed, multi-processor architecture of the SG routing node 270 facilitates the deployment of multiple LIM, sDCM and other cards, all of which could be simultaneously connected to and communicating via IMT bus 274.

MASP pair 272 implement the maintenance and administration subsystem functions described above. As the MASP pair 272 are not particularly relevant to a discussion of the flexible routing attributes of the present invention, a detailed discussion of their function is not provided herein. For a comprehensive discussion of additional MASP operations and functionality, the above-referenced Tekelec IP$^7$ Secure Gateway™ and Eagle® STP publications can be consulted.

Given the SG routing node internal architecture shown in FIG. 3 and briefly discussed above, it will be appreciated that one fundamental operation of the SG 270 involves the receipt of a signaling message at LIM 276 from an SS7 network and the subsequent internal routing of this message to sDCM 278 for transmission via a TCP/IP communication socket to one of the pair of MGC nodes 284 or 286, and vice versa. Since the receipt and subsequent processing of SS7 message signaling units (MSUs) by a LIM card is not particularly relevant to the dynamic routing key registration functionality of the present invention, a detailed discussion of such LIM operation is not provided herein. Instead, the above mentioned *Eagle® Feature Guide* can be consulted for a detailed discussion of LIM operation and functionality.

It should be noted that it is often the case that MGC nodes, such as those shown in FIG. 3, are deployed in pairs so as to provide resource redundancy. In such cases, network operators often prefer to designate one of the MGC nodes as a primary resource, while the other is held in reserve as a backup resource. Consequently, there is no load sharing between or simultaneous operation of the two MGC nodes. When the active or primary MGC node is manually taken off-line or fails, the reserve or backup MGC node must be placed in service. The sDCM card, and more particularly, the dynamic routing key registration feature of the present invention is adapted to facilitate automatic changeover in such a scenario. As used herein, the term "changeover" refers to the process of diverting traffic from a failed signaling link to a backup signaling link. In one embodiment, a variety of transport adapter layer interface (TALI) dynamic routing key registration messages are employed to realize such self-directed MGC node behavior. It will be appreciated that other signaling protocols similar in nature to TALI (e.g., SIP, SDP, SUA, M2UA, M3UA, H.323, etc.) could also be employed to provide such functionality.

Dynamic Routing Key Registration Message Structure

Figure 4:
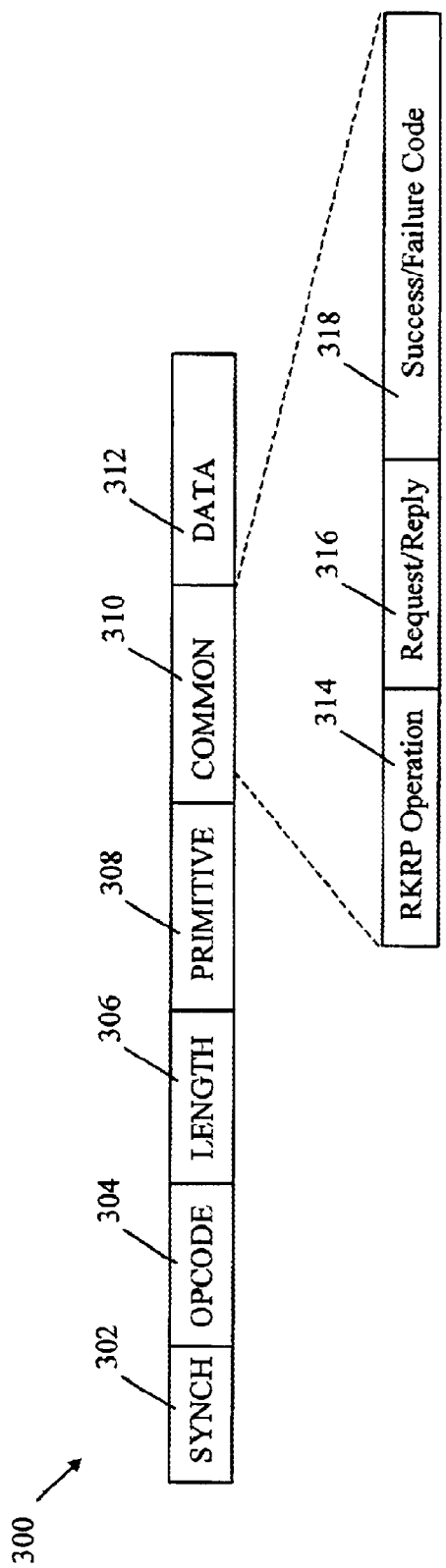
FIG. 4 is a diagram of a general transport adapter layer interface (TALI) registration message structure according to an embodiment of the present invention.

Shown in FIG. 4 is a sample TALI dynamic routing key registration message structure, generally indicated by the numeral 300. TALI message structure 300 includes a number of fields that are common to all TALI dynamic routing key registration messages including: a synch field 302, an opcode field 304, a length field 306, a primitive field 308, a common field 310, and a data field 312. Common field 310 further includes an operation field 314, a request/reply field 316, a success/failure code field 318.

Within a message packet, synch field 302 is used to identify the message packet as being of a transport adapter layer interface (TALI) format. As used herein "TALI" refers to the transport adapter layer interface as described in Internet Engineering Task Force (IETF) Internet Draft <draft-benedyk-sigtran-tali-01.txt> entitled "Transport Adapter Layer Interface," June 2000, the disclosure of which is incorporated herein by reference in its entirety. TALI is a protocol that defines procedures and message structures for communicating SS7 messages over a stream-oriented packet-based network, such as a TCP/IP network. However, the present invention is not limited to using TALI over TCP/IP to communicate between SS7 and IP nodes. In an alternative embodiment of the invention, stream control transmission protocol (SCTP) over IP may be used. The stream control transmission protocol is described in RFC 2960: Stream Control Transmission Protocol, the disclosure of which is incorporated herein by reference in its entirety.

Opcode field 304 identifies the type of operation associated with the message. For dynamic routing key registration related messages, an opcode value equal to "mgmt" is used. Length field 306 simply indicates the length of the message (e.g., bits, octets, etc.). Primitive field 308 is used to specify a group of "mgmt" operations to which the message is applicable. A primitive field value of "rkrp" signifies a dynamic routing key registration message. RKRP operation field 314 specifies a particular operation within the group of allowed operations identified by the primitive. Message data field 312 employs a structure and contains information that are dependent on the combination of opcode/primitive/operation field values (i.e., each combination could employ a different message data structure).

RKRP operation field 314 contains an integer value that is used to identify the desired "rkrp" operation. Request/reply field 316 identifies whether the "rkrp" message is a request, sent by an IP node to the SG, indicating a particular type of "rkrp" action, or a reply to a previous request. Success/failure code field 318 provides a success/failure indication value as part of the reply back to an IP node for each processed request, while registration data field 312 includes specific information related to the creation, termination, or modification of a routing key—TCP/IP socket association.

It will be appreciated that RKRP operation field 314, request/reply field 316, success/failure code field 318, and registration data field 312 are common to all RKRP operation related messages. The primary purpose of requiring the data structures for all RKRP operations to begin with these same fields, is to provide a means for a receiver to reply to unknown RKRP messages in a consistent manner. When an sDCM card receives an RKRP request message that is not understood, the request is converted into a reply and the success/failure code field value is used to indicate that the operation is not supported (e.g., with an RKRP reply code of 'Unsupported 'rkrp' operation, 3').

As discussed above, the specific type and quantity of information contained within a routing key registration message is a function of the character of the particular routing key with which it is associated. Shown in FIG. 5 is a table 330, which provides examples of routing key types 332 and the related information or data fields that are supplied by a TALI dynamic routing key registration message. For the purposes of discussion, the routing keys shown in this example can be broadly classified as either circuit identification code (CIC) based, signaling connection control part (SCCP) based, or non-CIC/non-SCCP based. Wildcard or partial routing key descriptions are permitted, several of which are presented in table 330. It will be appreciated that wildcard routing key rules could also be defined for the CIC and SCCP based classes, as well. Such wildcard descriptions are used to facilitate default routing rules based on a partial routing key definition. Specifically, table 330 defines the data content associated with a destination point code-service indictor-originating point code (DPC-SI-OPC) routing key, a DPC-SI wildcard key, a DPC wildcard key, an SI wildcard key, and a universal default wildcard key.

As indicated in FIG. 5, data fields associated with TALI dynamic routing key messages include: a set of common data fields 334 (as described above), an RKRP flag field 336, an SI field 338, a DPC field 340, an OPC field 342, a CIC range start (CICS) field 344, a CIC range end (CICE) field 346, a CIC split field 348, a new CICS (NCICS) field 350, a new CICE (NCICE) field 352, and a subsystem (SSN) field 354. Some or all of the above described data fields may be required depending upon the particular type of routing key to be registered. For example, as indicated in table 330, a registration message associated with a SCCP based routing key could include the common field values (i.e., RKRP operation field 314, request/reply field 316, success/failure code field 318), an RKRP flag value, an SI value, a DPC value, and an SSN value.

It should be noted that the RKRP flag is a 2-byte field that provides 16 possible flags that control various aspects of the dynamic routing key registration operation. In one embodiment, Bit 0 serves as an override bit that is used to control how a TCP/IP socket association for a particular routing key should be manipulated. As such, the RKRP flag determines if the dynamic routing key update transaction is intended to add a specified socket association in a "load-sharing" mode or if a new association should replace (i.e., override) all existing socket associations. It is through the use of the RKRP flag that a TCP/IP capable node, via an override-designated TCP/IP socket registration request, can re-direct and subsequently receive all traffic associated with a particular routing key.

Self-Registration Data Communication Module (sDCM) Architecture

Figure 6:
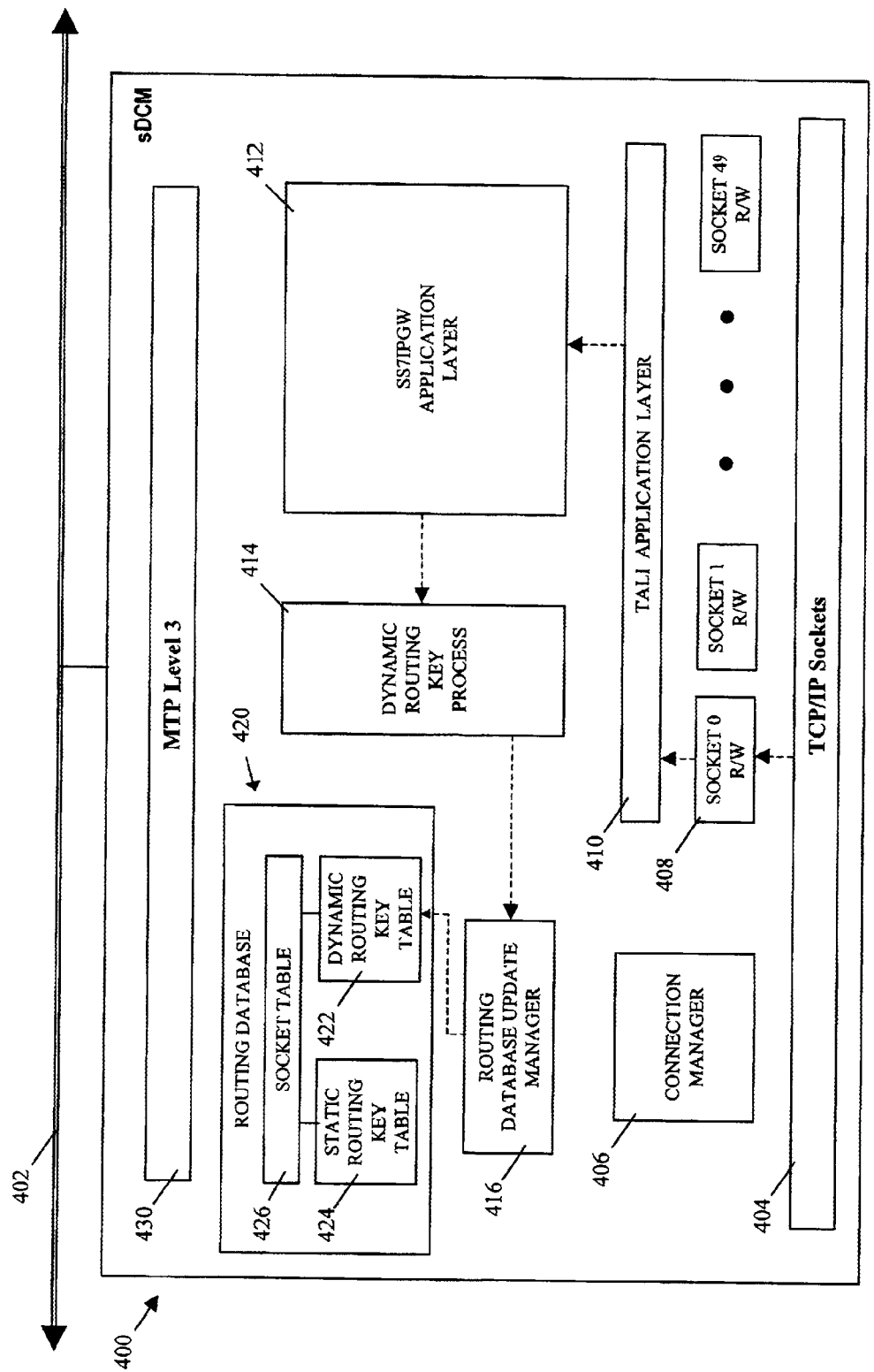
FIG. 6 is a block diagram illustrating a TALI registration message flow through an sDCM card according to an embodiment of the present invention.

Shown in FIG. 6 is a self-registration data communication module (sDCM) of the present invention, generally indicated by reference numeral 400. sDCM 400 is connected to IMT communication bus 402 and is comprised of a number of functional processes. These processes include: a TCP/IP socket layer 404 for administering lower level TCP/IP protocol functions associated with up to 50 TCP/IP sockets. TCP/IP socket layer 404 is adapted to provide the facilities necessary to send and receive digital data over a particular physical media/physical interface, such as an Ethernet type communication link. sDCM 400 also includes a connection manager process 406 for monitoring the status of and generally managing all TCP/IP sockets, a TCP/IP socket read/write process 408 for buffering and performing basic input/output (I/O) type operations for each socket, a TALI application layer 410 for adding/removing appropriate TALI header and/or trailer information to outgoing/incoming message packets, and an SS7IPGW application layer 412 for interpreting and processing TALI messages. Of particular relevance to the present invention is a dynamic routing key process 414 which is adapted to process TALI dynamic routing key registration messages and communicate pertinent registration information to a routing database update manager process 416. Routing database update manager process 416 is adapted to administer data table updates and generally control table lookup operations within the sDCM specific routing database, which is generally indicated by the numeral 420. In one embodiment, routing database 420 is comprised of a dynamic routing key table 422, a static routing key table 424, and a socket table 426.

In the case of an outbound signaling message routing operation, it will be appreciated that routing database update manager process 416 effectively controls the sequence in which the dynamic and static table lookups occur. More particularly, the dynamic routing key table 422 is always searched initially, followed by a search of the static table 424 in the event that no match is located in the dynamic data table 422. sDCM 400 includes a message transport part (MTP) level 3 process 430 and additional functional processes beyond those shown in FIG. 6. However, it will be appreciated that the MTP level 3 process and other such additional functional processes are not particularly relevant to a discussion of the present invention, and are therefore not discussed in detail herein. An in depth discussion of such higher level processing functionality can be found in the above-referenced Tekelec SG and STP Feature Notice Publications.

Again, it will be appreciated that the message packets received and transmitted by the sDCM card 400 may include TALI type messages, session initiation protocol (SIP), M2UA, M3UA, SUA, H.323, SCTP/IP, or other signaling protocols that may be transported via TCP/IP or similar IP based protocols. Preferred packet formats for encapsulating various types of SS7 messages in IP packets are described in the above-referenced TALI IETF Internet Draft. Furthermore, functionality associated with the TALI protocol is described in commonly-assigned, co-pending International Patent Publication No. WO 00/76134, the disclosure of which is incorporated herein by reference in its entirety. Again, it will be appreciated that the concepts described in this disclosure are not dependent on the above-referenced TALI signaling protocol. Other functionally similar signaling protocols are intended to be within the scope of the present invention. For example, the IETF SUA/M3UA protocol may be used.

FIG. 7 illustrates an example of dynamic routing key table 422, which contains a set of sample dynamic routing key entries. The table contains a plurality of routing key fields including a DPC field 450, an OPC field 452, an SI field 454, a CICS field 456, a CICE field 458, a CIC split field 460, a NCICS field 462, a NCICE field 464, and a SSN field 466. Associated with each routing key entry in the dynamic routing key table 422 is a TCP/IP socket identifier 468. In an alternate embodiment, multiple TCP/IP socket identifiers may be associated with a single routing key entry, and, as such, signaling traffic corresponding to a particular routing key may be load shared across a plurality of provisioned TCP/IP connections, which are identified locally by their associated sockets. In any event, socket identifier 468 is used as an index to a particular entry in the socket table 426. Those skilled in the art of SS7 network operation will appreciate that such routing keys are commonly employed in SS7 routing nodes (i.e., SGs, STPs) to determine how and where a signaling message packet should be routed. It will also be appreciated that many different combinations of signaling message parameters may be used to form a routing key, and as such, the particular structure presented in FIG. 7 is simply one of many possible dynamic routing key table structures.

As indicated in FIG. 8, socket table 426 is indexed by a socket identifier 480, which is associated with local end TCP/IP connection information 482, and distant end TCP/IP connection information 484. Also associated with each entry in the socket table is a socket status parameter 486, which indicates the availability status of each socket defined in the table.

It should be appreciated that, in a preferred embodiment, the structure of static routing key table 424 is similar to that of dynamic routing key table 422, illustrated in FIG. 7. The difference between these two routing key tables is primarily how they are updated and the order in which they are accessed during a routing key lookup operation. More particularly, static routing key table 424 is adapted to maintain a set of routing key entries that cannot be updated or modified by routing key registration signaling messages originated by another network element. Such routing key registration type signaling messages may effect changes only in the dynamic routing key table 422.

Once again, it will be appreciated that the database structures and tables described above are merely illustrative of the types of data that can be employed to provide the functionality of an sDCM of the present invention.

sDCM Registration Operation

In addition to sDCM functional processes, FIG. 6 also illustrates an information flow path associated with the receipt of a TALI dynamic routing key registration request message. More particularly, the dashed line in FIG. 6 illustrates an exemplary path for a dynamic routing key registration request message received from an IP node. In this example, it is assumed that the dynamic routing key registration request message originates from an IP based network element, such as a media gateway controller (MGC) node, that is connected to the signaling gateway which contains sDCM 400. Such a hypothetical network architecture is generally illustrated in FIG. 3.

In any event, a dynamic routing key registration request message is received on the socket 0 connection via TCP/IP socket layer 404. Socket layer 404 performs lower protocol level processing on the incoming message packet and subsequently passes message to socket 0 R/W process 408. Socket 0 R/W process 408 temporarily buffers the received message and forwards the message to TALI application layer 410. TALI application layer 410 receives the incoming TALI dynamic routing key registration request message and performs a variety of TALI-specific message administration processes. TALI layer 410 subsequently directs the message to SS7IPGW application layer 412, where the message is determined to be a dynamic routing key registration request message. In response to identifying the message as a dynamic routing key registration request, application layer 412 directs the message to the dynamic routing key registration process 414.

In one embodiment, dynamic routing key registration process 414 extracts and re-formats relevant information contained in the received message in a manner such that the information may be effectively used by routing database update manager 416. In an alternate embodiment, routing database update manager process 416 may be capable of receiving a dynamic routing key message and directly processing the message.

In any event, routing database update manager process 416 uses the information contained within or gleaned from the dynamic routing key registration message to administer an update of dynamic routing key table 422. Again, such dynamic routing key table update operations might include the addition of a new TCP/IP socket association, the removal of an existing TCP/IP socket association, or modification of routing key information associated with an existing TCP/IP socket.

Presented in FIG. 9 is a table 500 containing a sample set of return codes that are employed by an sDCM in acknowledging the receipt and subsequent processing of a dynamic routing key registration request message. Each entry contained in table 500 includes a TALI return code 502, a service indicator 504 which indicates when a return code is to be used, and a message type 506 which also determines when a return code is to be used. For example, in the event that a TALI dynamic routing key registration message is successfully received and processed by sDCM 400, a dynamic routing key registration acknowledgment message would be formulated based on the original registration message, which includes a return code value of 1 (FIG. 9).

It will be appreciated that in one embodiment, a TALI dynamic routing key registration acknowledgment message is simply a copy of the received dynamic routing key registration message, with the request/reply field 316 (as shown in FIG. 4) set to a value indicative of a "reply", and an appropriate return code included in the success/failure code field 318 (FIG. 4). It will be appreciated that in an alternate embodiment, an acknowledgment message could be constructed in a more compact format so as to minimize bandwidth usage.

Figure 10:
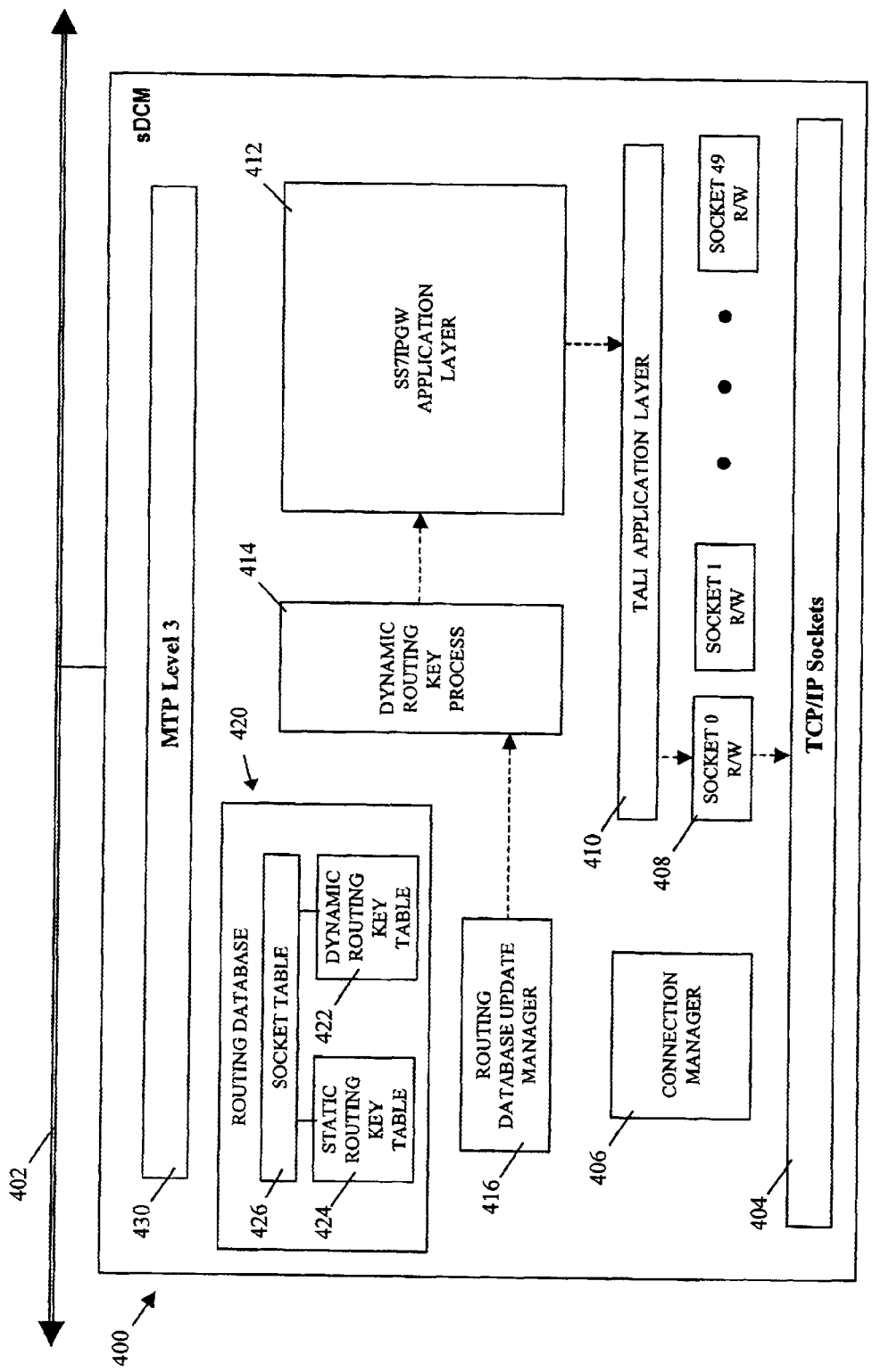
FIG. 10 is a block diagram illustrating a TALI registration acknowledgment message flow through an sDCM card according to an embodiment of the present invention.

Shown in FIG. 10 is an information flow diagram associated with a TALI dynamic routing key registration acknowledgment message. As in previous figures, the dashed line illustrates an exemplary message flow path. FIG. 10 includes sDCM card 400 as presented in FIG. 6 and previously described in the preceding section. As indicated in FIG. 10, routing database update manager process 416 is responsible for initiating an acknowledgment message. As discussed previously, the acknowledgment message is formulated in response to the receipt and subsequent processing of a dynamic routing key registration request message.

As such, routing database update manager process 416 directs the acknowledgment message to dynamic routing key registration process 414, which in turn passes the message to SS7IPGW application layer 412. SS7IPGW layer 412 determines that the message is to be transmitted via an on-card TCP/IP socket and subsequently directs the acknowledgment message to TALI application layer 410. TALI application layer 410 appends appropriate TALI header information to the message and passes the message to the appropriate socket R/W process. In this particular example, the acknowledgment message is passed to the socket 0 R/W process 408, and eventually transmitted to the sender of the original routing key registration message via TCP/IP socket layer 404.

Figure 11:
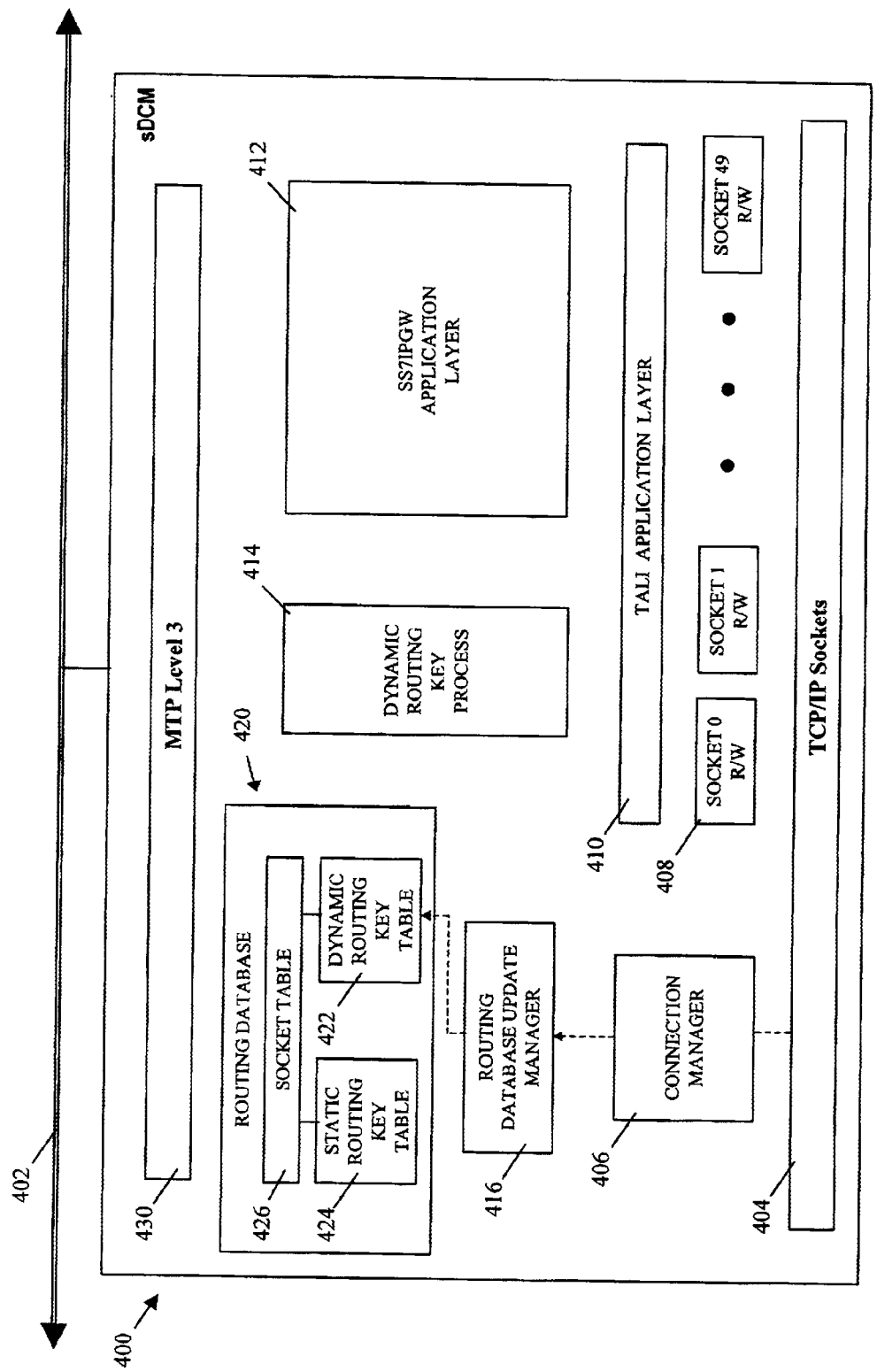
FIG. 11 is a block diagram illustrating sDCM card response to a failed socket according to an embodiment of the present invention.

Shown in FIG. 11 is an information flow diagram associated with the unanticipated or non-graceful closure of a TCP/IP connection. Once again, FIG. 11 includes sDCM card 400 as presented in FIG. 6 and previously described in the preceding section. In such an unanticipated connection closure scenario, an explicit dynamic routing key registration message can obviously not be communicated to sDCM 400 prior to connection failure. Instead, sDCM connection manager process 406 is responsible for monitoring the status or viability of all TCP/IP connections and subsequently notifying the routing database update manager 416 in the event of a socket failure.

It is assumed in FIG. 11 that a connection has failed unexpectedly and that connection manager process 406 has observed the failure. In response, connection manager process 406 sends information regarding this connection failure to routing database update manager process 416, which in turn updates dynamic routing key table 422 and socket table 426 accordingly. In one embodiment, all entries in dynamic routing key table 422 associated with the failed connection are deleted, and the associated socket definition entry is also deleted from socket table 426. In an alternate embodiment, all entries in dynamic routing key table 422 associated with the failed connection are left intact, and the associated socket definition entry in socket table 426 is marked with a status "unavailable."

sDCM Routing Operation

Figure 12:
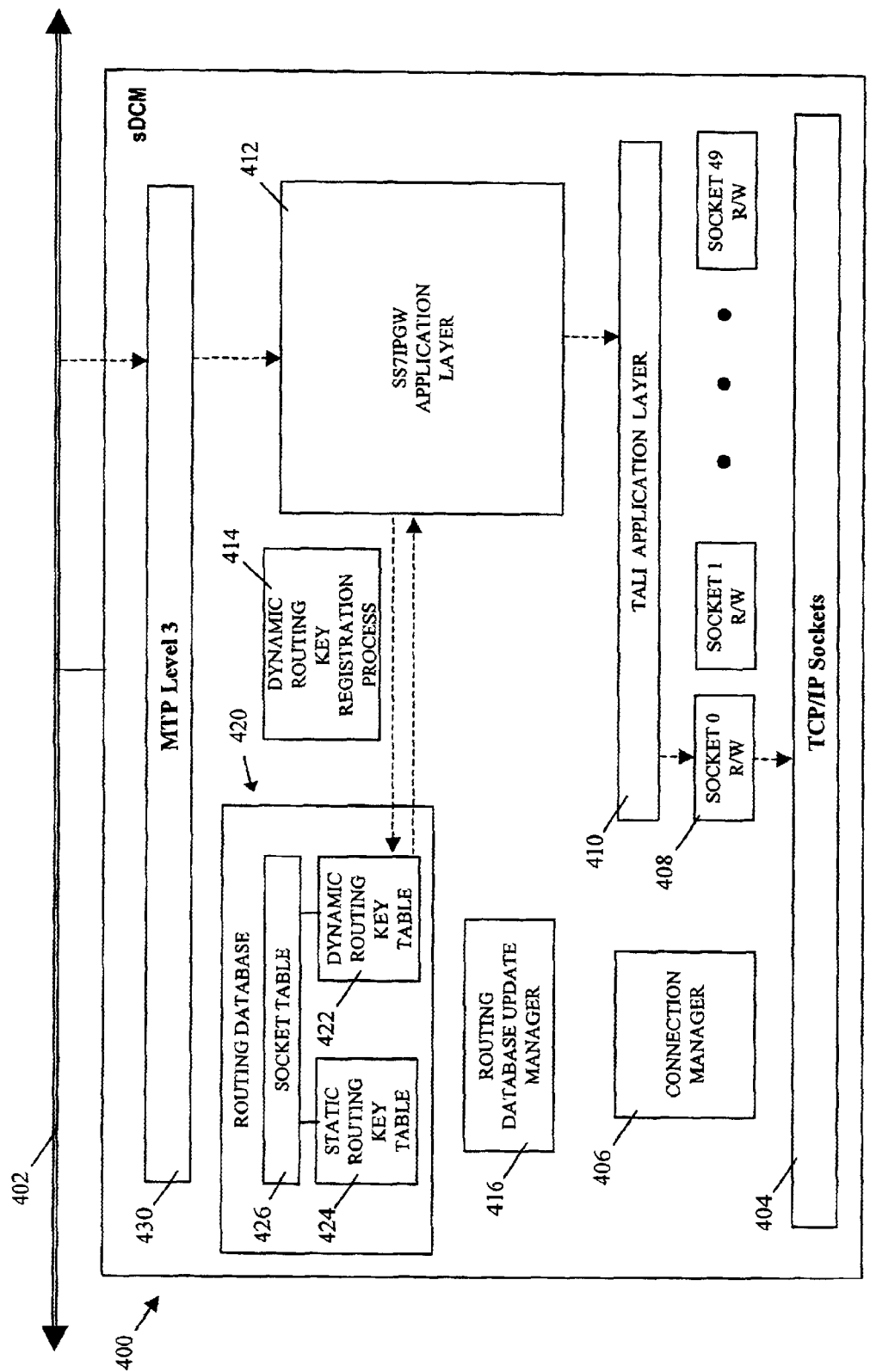
FIG. 12 is a block diagram illustrating signaling message flow associated with a primary lookup in a routing key database according to an embodiment of the present invention.
Figure 13:
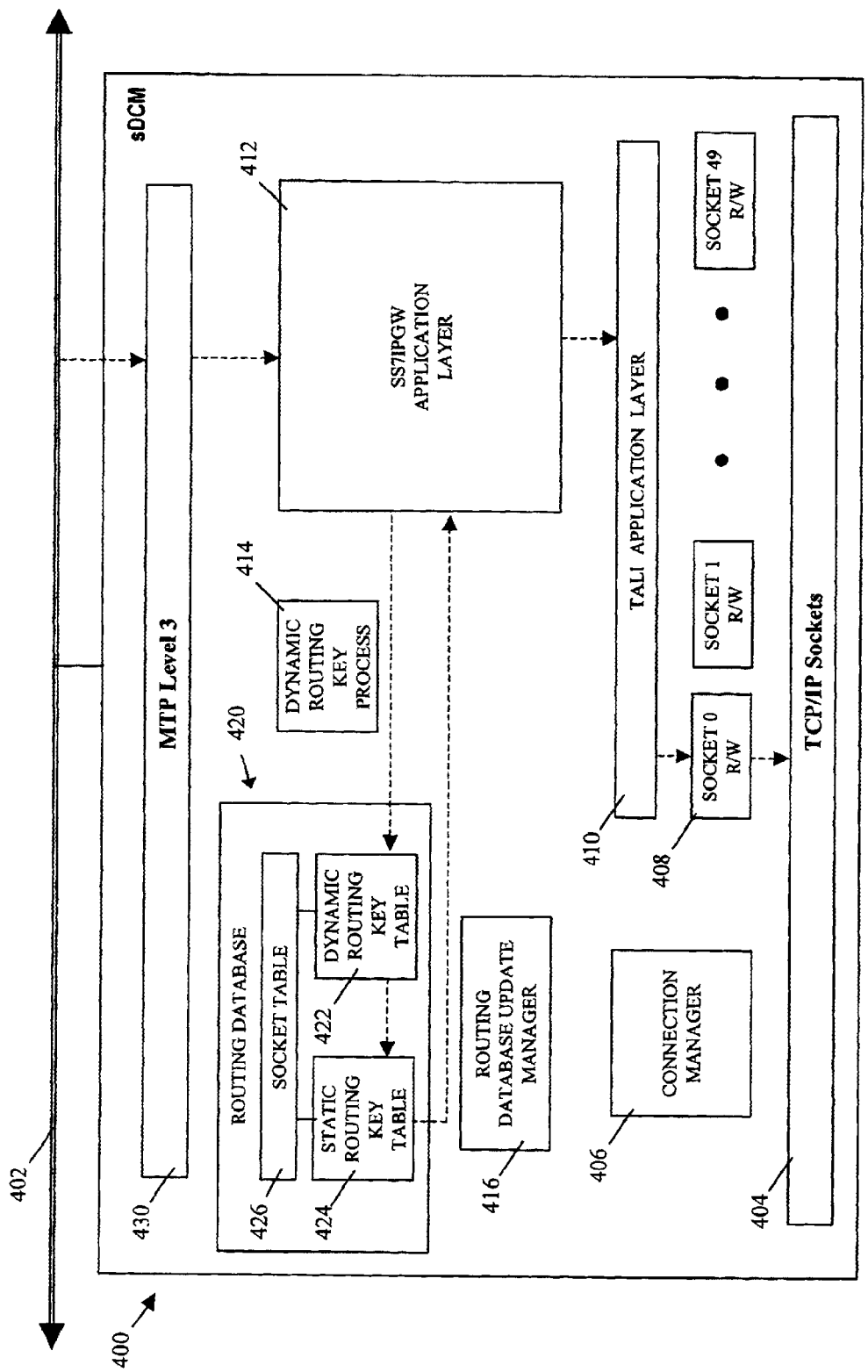
FIG. 13 is a block diagram illustrating signaling message flow associated with a default lookup in a routing key database according to an embodiment of the present invention.

Shown in FIGS. 12 and 13 are information flow diagrams associated with the routing of a signaling message. Once again, FIGS. 12 and 13 include sDCM card 400 as presented in FIG. 6 and previously described in the preceding section. Also, FIG. 14 includes a flow chart that illustrates the basic steps associated with routing key table access on the sDCM 400, and may be used in conjunction with FIGS. 12 and 13 to better understand routing database operation.

Figure 14:
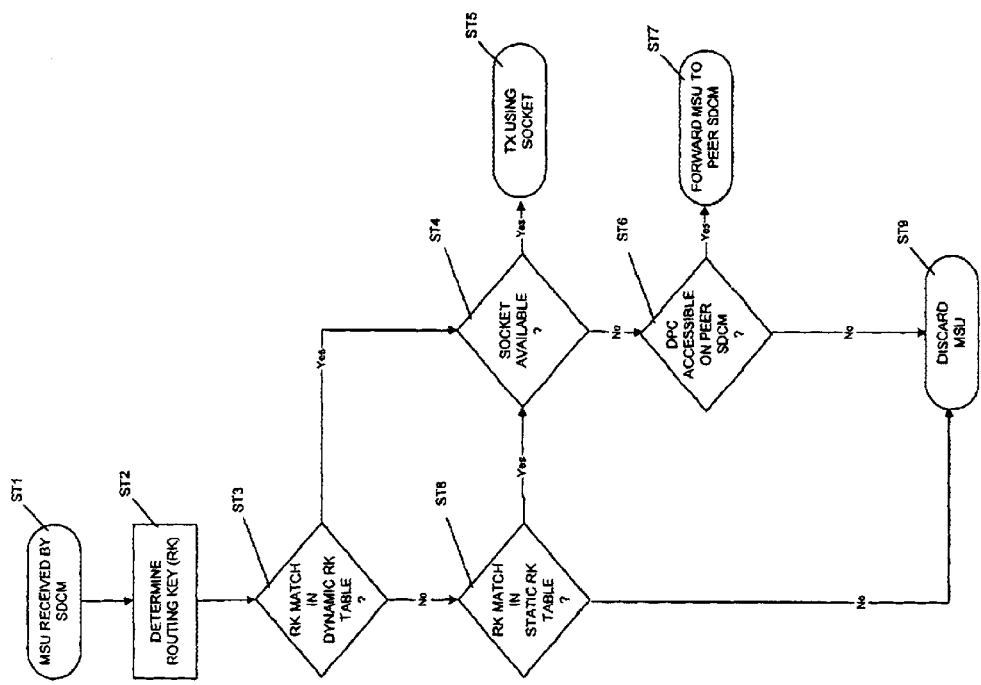
FIG. 14 is a flow chart illustrating table lookup sequences in a routing key database according to an embodiment of the present invention.

In the example scenario illustrated in FIG. 12, it is assumed that an outbound signaling message has been sent to sDCM 400 from another communication module in a signaling gateway routing node according to an embodiment of the present invention. For instance, LIM 276 may internally route a signaling message to sDCM 278 via IMT bus 274, as shown in FIG. 3. In any event, it will be appreciated that a signaling message is received by sDCM 400 via IMT bus 402, as indicated in FIG. 12. The received signaling message requires routing instructions before transmission to a destination node can be performed, and as such the routing database 420 must be accessed. As indicated in FIG. 12, the signaling message is eventually received by the SS7IPGW application layer 412, which subsequently requests routing information from the routing database 420. Using information contained within the outbound signaling message, one or more of the routing key tables provisioned in the routing database are accessed. More particularly, the sequence in which the dynamic and static routing key tables 422 and 424, respectively, are accessed is a key component of the present invention. As indicated in FIG. 14, dynamic routing key table 422 is accessed first. If a routing key is not found in dynamic routing key table 422 that matches the relevant information contained in the outbound signaling message, then a secondary or default routing key lookup is initiated in the static routing key table 424, as generally illustrated in FIG. 13.

It will be appreciated that the routing of an outbound signaling message is a complex operation and entails a number of additional steps above and beyond those discussed herein. As these additional steps are not particularly relevant to the present invention, they are not explicitly presented in this disclosure. A more detailed discussion of overall signaling message routing operations may be found in the above referenced *Eagle® Feature Guide* and *Feature Notice IP⁷ Secure Gateway*™ publications.

Referring to FIG. 14, it will be appreciated that following receipt of the outbound signaling message (ST1) from IMT bus 402, the signaling message is examined and relevant routing information is gleaned (ST2). A lookup operation is then performed in the dynamic routing key table 422 using the routing information gleaned from the signaling message (ST3), and if a routing key match is found in the dynamic routing key table 422, the status of a selected TCP/IP socket is determined (ST4). It should be noted that in the event that multiple sockets are associated with the matching dynamic routing key, a specific TCP/IP socket may be selected based on a signaling link selector (SLS) parameter contained in the signaling message. In the event that the selected TCP/IP socket is available, the signaling message is transmitted via the selected socket (ST5). In the event that the selected socket is not available, and there are no other available sockets associated with the matching dynamic routing key, a determination is made as to whether the destination point code associated with the destination of signaling message is accessible via a peer communication module (sDCM, DCM, LIM, etc.) that is currently provisioned in the signaling gateway routing node (ST6). If such a peer communication module exists in the routing node, the signaling message is forwarded to that communication module for routing/transmission (ST7). If such a peer communication module does not exist, the signaling message may be discarded (ST9).

In the event that the lookup in the dynamic routing key table does not yield a matching routing key entry, a secondary or default lookup operation is performed in the static routing key table 424 (ST8). If a match is found the status of a selected TCP/IP socket is determined (ST4). Again, it will be appreciated that in the event that multiple sockets are associated with the matching static routing key, a specific TCP/IP socket may be selected based on a signaling link selector (SLS) parameter contained in the signaling message. In the event that the selected TCP/IP socket is available, the signaling message is transmitted via the selected socket (ST5). In the event that the selected socket is not available, and there are no other available sockets associated with the matching static routing key, a determination is made as to whether the destination point code associated with the destination of signaling message is accessible via a peer communication module (sDCM, DCM, LIM, etc.) that is currently provisioned in the signaling gateway routing node (ST6). If such a peer communication module exists in the routing node, the signaling message is forwarded to that communication module for routing/transmission (ST7). If such a peer communication module does not exist, or if there is no routing key match found in the static routing key table 424 then the signaling message may be discarded (ST9).

Automatic Changeover

Figure 15:
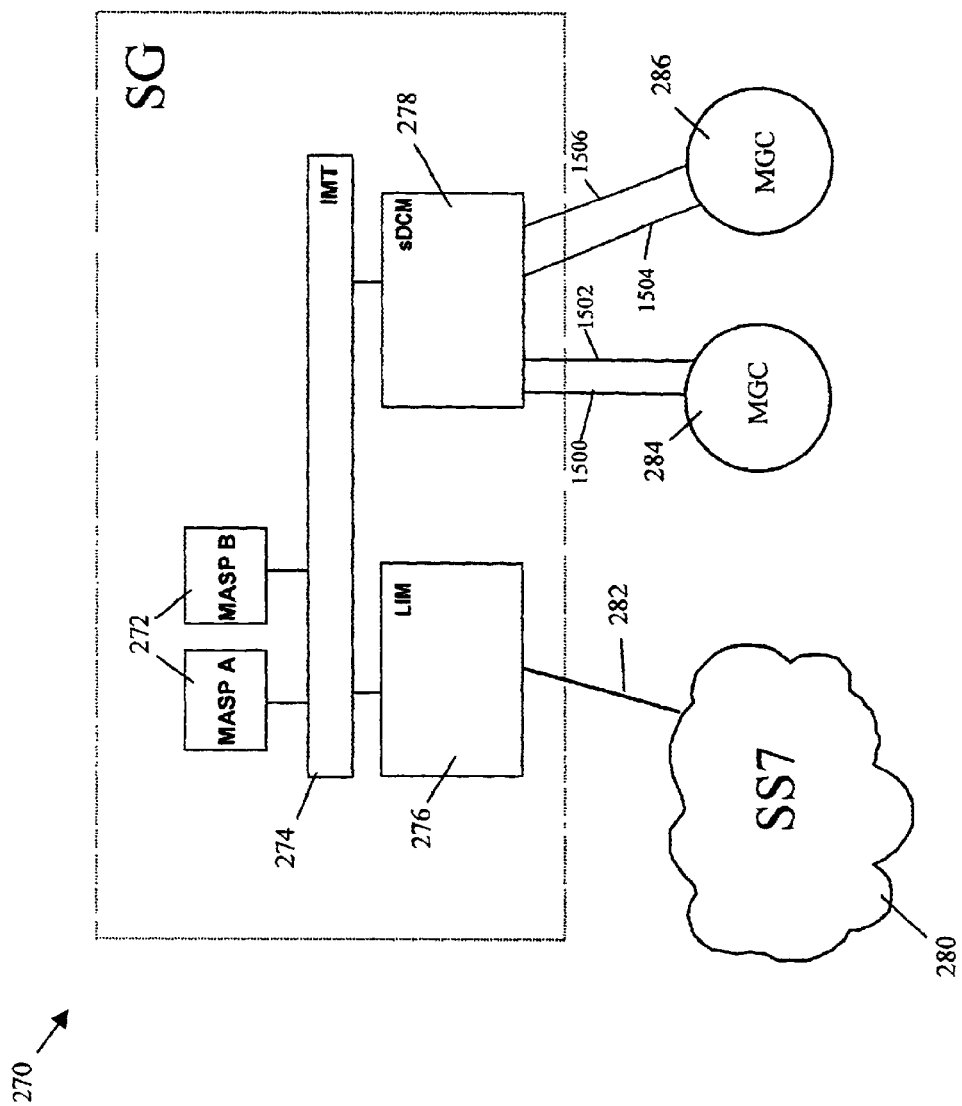
FIG. 15 is a network diagram illustrating dynamic changeover functionality according to an embodiment of the present invention.

The dynamic registration procedures described herein are especially well suited to provide reliability in an IP telephony network that utilizes IP-base call control nodes, such as media gateway controllers (MGCs), to set up and tear down calls. FIG. 15 is a network diagram including a pair of MGCs 284 and 286 and a signaling gateway 270. These components are the same as the correspondingly-numbered components described above with respect to FIG. 3. Hence a description thereof will not be repeated herein. In the illustrated network, two stream-oriented connections 1500 and 1502 are established between MGC 284 and SG 270. Similarly, two stream-oriented connections 1504 and 1506 are established between MGC 286 and SG 270. Stream oriented connections 1500, 1502, 1504, 1506, and 1508 may be TALI over TCP/IP connections or SCTP/IP connections. Connections 1500, 1502, 1504, 1506, and 1508 may be set up using connection establishment procedures, such as the TCP three-way handshake, when MGCs 284 and 286 are brought on line.

One of the connections 1500 and 1502 may be a primary connection over which communication occurs and the other connection may be a backup connection for carrying traffic in response to failure of the first connection. Similarly, one of the connections 1504 and 1506 may be a primary connection over which communication occurs and the other connection may be a backup connection for carrying call signaling traffic only in response to failure of the first connection. The present invention is not limited to two connections between communicating nodes, and it is understood that any number of primary and backup connections could be used.

MGCs 284 and 286 preferably monitor the status of primary connections 1500 and 1504. For example, MGCs 284 and 286 may determine whether the sockets associated with connections 1500 and 1504 are functioning properly. In response to detecting a failure on one of the primary connections 1500 or 1504, the MGC that manages the failed connection preferably sends a routing key registration message over the backup connection to notify sDCM 278 to start sending data over the backup connection. It would seem that this would result in two entries in dynamic routing key table 422 having the same routing keys. However, as discussed above with respect to FIG. 14, sDCM 278 checks the availability of a socket before sending the data over a TCP connection and if the socket indicates that the connection is unavailable, sDCM 278 looks for another socket within the routing key entry. In the automatic changeover situation, the other socket would be the socket associated with the backup connection. Thus, the routing key registration procedures described herein facilitate seamless changeover when one of two connections between a signaling gateway and an IP node fail.

The same automatic changeover procedure can be used to switch communication between a primary IP node and a backup IP node. For example, MGC 284 may be a primary IP node and MGC 286 may be a backup IP node. If MGC 284 fails, MGC 286 may detect this failure using inter-MGC communications and send a routing key registration request to SG 270 to direct traffic originally routed to MGC 284 to itself. It is understood that in this situation, MGC 286 would store state information of MGC 284 so that switching would occur seamlessly.

It will be appreciated that various details of the invention may be changed without departing from the scope of the invention. Furthermore, the foregoing description is for the purpose of illustration only, and not for the purpose of limitation—the invention being defined by the claims.

What is claimed is:

1. A method for use in a communication network for enabling a signaling node to automatically update routing instructions that are maintained at a network routing node, the method comprising:
   (a) at a signaling node in an Internet protocol network, generating a routing key registration message, the routing key registration message including SS7 routing key data for updating the status of routing key information associated with the signaling node, the SS7 routing key data including at least one of an originating point code (OPC), a destination point code (DPC), a service indicator (SI), a subsystem number (SSN), and a circuit identification code (CIC);
   (b) sending the routing key registration message to a network routing node capable of routing messages between the IP network and an SS7 network; and
   (c) at the network routing node, receiving the routing key registration message and using the SS7 routing key data in the routing key registration message to dynamically update a routing key database entry associated with a connection between the signaling node and the network routing node, wherein using the SS7 routing key data includes extracting the at least one of an OPC, a DPC, an SI, an SSN, and CIC from the routing key registration message and using the at least one of an OPC, a DPC, an SI, an SSN, and a CIC extracted from the routing key registration message to update corresponding fields in the routing key database entry.

2. The method of claim 1 wherein generating a routing key registration message includes generating a transport adapter layer interface (TALI) message.

3. The method of claim 1 wherein generating a routing key registration message includes generating a stream control transmission protocol (SCTP) message.

4. The method of claim 1 wherein generating a routing key registration message includes generating an SS7 MTP level two user adaptation layer (M2UA) message.

5. The method of claim 1 wherein the SS7 routing key data includes a DPC and wherein using the SS7 routing key data contained in the routing key registration message to dynamically update a routing key database entry includes using the DPC in the routing key registration message to update a DPC in the routing key database entry.

6. The method of claim 1 wherein the SS7 routing key data includes an OPC and wherein using the SS7 routing key data contained in the routing key registration message to dynamically update a routing key database entry includes using the OPC in the routing key registration message to update an OPC in the routing key database entry.

7. The method of claim 1 wherein the SS7 routing key data includes an SI and wherein using the SS7 routing key data contained in the routing key registration message to dynamically update a routing key database entry includes using the SI in the routing key registration message to update an SI in the routing key database entry.

8. The method of claim 1 wherein the SS7 routing key data includes a CIC and wherein using the SS7 routing key data contained in the routing key registration message to dynamically update a routing key database entry includes using the CIC or a range of CICs in the routing key registration message to update a CIC value or range of CIC values in the routing key database entry.

9. The method of claim 1 wherein the SS7 routing key data includes an SSN and wherein using the SS7 routing key data contained in the routing key registration message to dynamically update a routing key database entry includes using the SSN in the routing key registration message to dynamically update an SSN in the routing key database entry.

10. The method of claim 1 wherein sending the routing key registration message includes sending the message over an IP socket.

11. A method for routing a signaling message by a network routing node, the method comprising:
   (a) receiving a signaling message that requires routing;
   (b) using SS7 routing key information contained in the signaling message to search for a match in a first routing key table, the SS7 routing key information including at least one of an originating point code (OPC) and a destination point code (DPC);
   (c) in response to locating a match in the first routing key table, routing the signaling message using routing information returned by the first routing key table;
   (d) in response to failing to locate a match in the first routing key table, using the information contained in the signaling message to search for a match in a second routing key table; and
   (e) in response to locating a match in the second routing key table, routing the signaling message using routing information returned by the second routing key table.

12. The method of claim 11 wherein receiving a signaling message includes receiving a signaling system 7 (SS7) signaling message.

13. The method of claim 11 wherein receiving a signaling message includes receiving a transport adapter layer interface (TALI) signaling message.

14. The method of claim 11 wherein receiving a signaling message includes receiving a stream control transmission protocol (SCTP) signaling message.

15. The method of claim 11 wherein receiving a signaling message includes receiving a session initiation protocol (SIP) message.

16. The method of claim 11 wherein the SS7 routing key information includes a DPC and wherein using the SS7 routing key information to search for a match in the first or the second routing key table includes using the DPC.

17. The method of claim 11 wherein the SS7 routing key information includes an OPC and wherein using the SS7 routing key to search for a match in the first or the second routing key table includes using the OPC.

18. The method of claim 11 wherein the SS7 routing key information includes an SI and wherein using the SS7 routing key information to search for a match in the first or the second routing key table includes using the SI.

19. The method of claim 11 wherein the SS7 routing key information includes a CIC and wherein using the SS7 routing key information to search for a match in the first or the second routing key table includes using the CIC.

20. The method of claim 11 wherein searching for a match in a first routing key table includes searching for a match in a dynamic routing key table capable of receiving self-registration messages from IP nodes and automatically updating entries in the dynamic routing key table based on the self-registration messages.

21. A method for routing a signaling message by a network routing node, the method comprising:
(a) receiving a signaling message that requires routing;
(b) using information contained in the signaling message to search for a match in a first routing key table;
(c) in response to locating a match in the first routing key table routing the signaling message using routing information returned the first routing key table;
(d) in response to failing to locate a match in the first routing key table using the information contained in the signaling message to search for a match in a second routing key table; and
(e) in response to locating a match in the second routing key table, routing the signaling message using routing information returned by the second routing key table, wherein searching for a match in a second routing key table includes searching for a match in a static routing key table, containing routing key entries that are manually provisioned by an operator through a provisioning interface.

22. The method of claim 11 wherein the SS7 routing key information includes an SSN and wherein using the SS7 routing key information to search for a match in the first or the second routing key table includes using the SSN.

23. A method for performing reliable call signaling communications over an Internet protocol (IP) network using dynamic routing key registration, the method comprising:
(a) establishing a first IP connection between a signaling gateway and an IP node;
(b) establishing a second IP connection between the signaling gateway and the first IP node
(c) sending call signaling messages between the signaling gateway and the first IP node over the first IP connection; and
(d) in response to failure of the first IP connection, sending a routing key registration message from the first IP node to the signaling gateway over the second IP connection, the routing key registration message including at least one SS7 routing key for dynamically diverting signaling messages originally destined to be sent over the first IP connection to the second IP connection.

24. The method of claim 23 comprising establishing a third IP connection between the signaling gateway and a second IP node, and in response to detecting failure of the first IP node, sending a second routing key registration message from the second IP node to the signaling gateway, the second routing key registration message including at least one SS7 routing key for dynamically diverting traffic originally destined for the firs IP node to the second IP node.

25. The method of claim 23 wherein the first IP node comprises a media gateway controller.

26. The method of claim 23 wherein the first and second IP nodes each comprise media gateway controllers.

27. The method of claim 23 wherein the first IP node comprises a service control point.

28. The method of claim 23 wherein the first and second IP nodes each comprise a service control point.

29. A communication system that is adapted to enable a signaling node to automatically provide routing instructions to a signaling message routing node, the system comprising:
(a) a signaling node adapted to generate and send a routing key registration message that contains SS7 routing key information associated with the signaling node, the SS7 routing key information including at least one of an originating point code (OPC), a destination point code (DPC), a service indicator (SI), a subsystem number (SSN), and a circuit identification code (CIC); and
(b) a signaling message routing node including a routing key database, the signaling message routing node being adapted to receive the routing key registration message and to dynamically update an entry in the routing key database based on the SS7 routing key information, wherein the signaling message routing node is adapted to extract the at least one of an OPC, a DPC, an SI, an SSN, and a CIC from the routing key registration message and to update corresponding fields in the routing key database entry.

30. The system of claim 29 wherein the signaling node comprises a media gateway controller (MGC).

31. The system of claim 29 wherein the signaling node comprises a service control point (SCP).

32. The system of claim 29 wherein the signaling node comprises a database server.

33. The system of claim 29 wherein the routing key registration message comprises a transport adapter layer interface (TALI) message.

34. The system of claim 29 wherein the routing key registration message comprises a stream control transmission protocol (SCTP) message.

35. The system of claim 29 wherein the SS7 routing key information includes a DPC.

36. The system of claim 29 wherein the SS7 routing key information includes an OPC.

37. The system of claim 29 wherein the SS7 routing key information includes an SI.

38. The system of claim 29 wherein the SS7 routing key information includes a CIC.

39. The system for claim 29 wherein the SS7 routing key information includes an SSN.

40. The system of claim 29 wherein the signaling message routing node comprises an SS7-to-IP gateway routing node.

41. The system of claim 29 wherein the routing key database includes a dynamic routing key table having entries that are dynamically updated based on routing key registration messages received from IP nodes and a static routing key table having entries that are manually provisioned and that are not dynamically updated based on the routing key registration messages.

42. The system of claim 29 wherein the routing key database includes a single routing key table that includes both dynamic routing key data and static routing key data, the dynamic routing key data being dynamically updated based on received routing key registration messages and the static routing key data that is manually provisioned and that is not updated based on the routing key registration messages.

43. The system of claim 42 wherein the dynamic routing key data and the static routing key data are each binary tree (b-tree) indexed.

44. A network routing node that is adapted to receive routing key registration information from an associated signaling node and subsequently use the routing key registration information to update a routing database, the network routing node comprising:
   (a) a communication module adapted to receive a routing key registration message from an IP node in an IP network, the routing key registration message including SS7 routing key information for dynamically updating a routing key entry associated with a connection between the communication module and the IP node, the SS7 routing key information including at least one of an originating point code (OPC), a destination pint code (DPC), a service indicator (SI), a subsystem number (SSN), and a circuit identification code (CIC); and
   (b) a dynamic routing key registration process and a dynamic routing key registration table, the dynamic routing key registration process being adapted to dynamically update SS7 message routing data for a dynamic routing key table entry associated with the connection based on the SS7 routing key information contained in the routing key registration message.

45. A network routing node that is adapted to receive routing key registration information from an associated signaling node and subsequently use the routing key registration information to update a routing database, the network routing node comprising:
   (a) a communication module adapted to receive a routing key registration message from an IP node in an IP network, the routing key registration message including data for dynamically updating a routing key entry associated with a connection between the communication module and the IP node;
   (b) a dynamic routing key table adapted to dynamically update SS7 message routing data for a routing key table entry associated with the connection based on the information contained in the routing key registration message;
   (c) a static routing key table containing static routing key information that is not undated with the routing information contained in the routing key registration message; and
   (d) a manager process for controlling the sequence in which the dynamic and static routing key tables are searched during a routing operation.

46. The network routing node of claim 44 wherein the communication module comprises a self-registration data communication module (sDCM).

47. The network routing node of claim 44 wherein the routing key registration message comprises a transport adapter layer interface (TALI) message.

48. The network routing node of claim 44 wherein the routing key registration message comprises a stream control transmission protocol message.

49. The network routing node of claim 44 wherein the SS7 routing key information includes a DPC.

50. The network routing node of claim 44 wherein the SS7 routing key information includes an OPC.

51. The network routing node of claim 44 wherein the SS7 routing key information includes an SI.

52. The network routing node of claim 44 wherein the SS7 routing key information includes a CIC.

53. A self-registration data communication module for receiving dynamic routing key registration requests from signaling node in an Internet protocol (IP) network and for dynamically updating a routing key table based on the routing key registration requests, the self-registration data communication module comprising:
   (a) an interface for receiving routing key registration request messages from one or more signaling nodes in an IP network, each routing key registration request message including at least one of an originating point code (OPC), a destination point code (DPC), a service indicator (SI), a subsystem number (SSN), and a circuit identification code (CIC);
   (b) a dynamic routing key table for storing SS7 routing key information for routing SS7 signaling messages to the signaling nodes in the IP network based on corresponding routing key parameters in the signaling messages, the SS7 routing key information including the at least one of an OPC, a DPC, an SI, an SSN, and a CIC extracted from one of the routing key registration messages; and
   (c) dynamic routing key registration process for dynamically updating the routing key information in the routing key database in response to the routing key registration requests.

54. The self-registration data communication module of claim 53 wherein the interface is adapted to receive routing key registration request messages from a media gateway controller (MGC).

55. The self-registration data communication module of claim 54 wherein the interface is adapted to receive routing key registration request messages from a service control point (SCP).

56. The self-registration data communication module of claim 54 wherein the dynamic routing key table maps the SS7-based routing keys to TCP/IP socket associations for the signaling nodes in the IP network.

57. The method of claim 1 wherein the routing key registration message includes a flag for indicating whether the routing key data in the routing key registration message is intended to override an existing association in the routing key database, and wherein the method further comprises, in response to determining that the SS7 routing key information is intended to override the existing association, replacing the routing key data in the routing key database entry with the routing key data in the routing key registration message.

58. The method of claim 57 comprising, in response to determining that the routing key registration data in the routing key registration message is not intended to override the existing association, adding an entry to the routing key registration database corresponding to the routing key data contained in the routing key registration message.

59. The method of claim 1 comprising maintaining a static routing key database at the network routing node, the static routing key database including entries that are manually provisioned by a network operator.

60. The system of claim 29 wherein the routing key registration message includes a flag for indicating whether the routing key information in the routing key registration message is intended to override an existing association in the routing key database, and wherein, in response to determining that the SS7 routing key information is intended to override the existing association, the signaling message routing node is adapted to replace the routing key information in the routing key database entry with the routing key information in the routing key registration message.

61. The system of claim 60 wherein, in response to determining that the routing key registration information in the routing key registration message is not intended to override the existing association, the signaling message routing node is adapted to add an entry to the routing key registration database corresponding to the information contained in the routing key registration message.

62. The system of claim 29 wherein the signaling message routing node comprises a static routing key database ode, the static routing key database including entries that are manually provisioned by a network operator.

63. The network routing node of claim 44 wherein the routing key registration message includes a flag for indicating whether the SS7 routing key information in the routing key registration message is intended to override an existing association in the dynamic routing key registration table, and wherein, in response to determining that the SS7 routing key information is intended to override the existing association, the dynamic routing key registration process is adapted to replace the routing key information in the dynamic routing key table entry with the SS7 routing key information in the routing key registration message.

64. The network routing node of claim 63 wherein, in response to determining that the routing key registration information in the routing key registration message is not intended to override the existing association, the dynamic routing key registration process is adapted to add an entry to the routing key registration database corresponding to the SS7 routing key information contained in the routing key registration message.

65. The network routing node of claim 44 comprising a static routing key table including entries that are manually provisioned by a network operator.

66. The self-registration data communication module of claim 53 wherein the routing key registration message includes a flag for indicating whether the routing key information in the routing key registration message is intended to override an existing association, and wherein, in response to determining that the SS7 routing key information is intended to override the existing association, the dynamic routing key registration process is adapted to replace the routing key information in the routing key database entry with the routing key information in the routing key registration message.

67. The self-registration data communications module of claim 62, wherein in response to determining that the routing key registration information in the routing key registration message is not intended to override the existing association, the dynamic routing key registration process is adapted to add an entry to the routing key registration database corresponding to the information contained in the routing key registration message.

68. The self-registration data communications module of claim 53 comprising a static routing key database including entries that are manually provisioned by a network operator.

* * * * *